(12) United States Patent
Takaoka et al.

(10) Patent No.: US 6,522,024 B1
(45) Date of Patent: Feb. 18, 2003

(54) OUTPUT STATE DETECTOR FOR INTERNAL COMBUSTION ENGINE

(75) Inventors: Toshifumi Takaoka, Toyota (JP); Katsuhiko Hirose, Toyota (JP); Hiroshi Kanai, Toyota (JP); Toshio Inoue, Toyota (JP); Masaki Kusada, Toyota (JP); Takahiro Nishigaki, Toyota (JP); Masakiyo Kojima, Toyota (JP); Katsuhiko Yamaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/868,865

(22) PCT Filed: Sep. 17, 1999

(86) PCT No.: PCT/JP99/05074

§ 371 (c)(1),
(2), (4) Date: Jun. 21, 2001

(87) PCT Pub. No.: WO00/39444

PCT Pub. Date: Jul. 6, 2000

(30) Foreign Application Priority Data

Dec. 24, 1998 (JP) .......................................... 10-367238
Dec. 24, 1998 (JP) .......................................... 10-367253
Dec. 24, 1998 (JP) .......................................... 10-367256

(51) Int. Cl.[7] ................................................ F02N 11/06
(52) U.S. Cl. ........................ 290/40 C; 322/16; 180/65.2
(58) Field of Search ............................ 290/40 A, 40 C, 290/40 D; 318/8, 9; 180/65.2; 322/29, 16

(56) References Cited

U.S. PATENT DOCUMENTS

| 4,922,869 | A | | 5/1990 | Kadomukai et al. .... 123/192 R |
|---|---|---|---|---|
| 6,087,734 | A | * | 7/2000 | Maeda et al. ............... 180/65.2 |
| 6,244,368 | B1 | * | 6/2001 | Ando et al. ................. 180/65.2 |
| 6,356,817 | B1 | * | 3/2002 | Abe .......................... 290/40 A |
| 6,437,456 | B1 | * | 8/2002 | Kimura et al. ............. 290/40 C |
| 2001/0039230 | A1 | * | 11/2001 | Severinsky et al. ............ 477/3 |
| 2002/0117339 | A1 | * | 2/2002 | Nakashima ................ 180/65.4 |

FOREIGN PATENT DOCUMENTS

| JP | 62-29745 A | 2/1987 |
|---|---|---|
| JP | 4-265447 A | 9/1992 |
| JP | 5-52707 A | 3/1993 |
| JP | 6-288289 A | 10/1994 |
| JP | 8-294205 A | 11/1996 |
| JP | 9-256898 A | 9/1997 |
| JP | 2712332 A2 | 10/1997 |
| JP | 9-268941 A | 10/1997 |
| JP | 9-303193 A | 11/1997 |
| JP | 9-308012 A | 11/1997 |
| JP | 10-110636 A | 4/1998 |
| WO | WO 93/07019 | 4/1993 |

* cited by examiner

Primary Examiner—Nicholas Ponomarenko
(74) Attorney, Agent, or Firm—Oliff & Berridge, PLC

(57) ABSTRACT

An output state detecting apparatus is arranged to detect a reaction torque of a motor and detect an output state of an internal-combustion engine from the reaction torque. The apparatus comprises an internal-combustion engine, a generator driven by the internal-combustion engine to generate electric power, torque detecting means for detecting a reaction torque of this generator, and output state detecting means for detecting an output state of the internal-combustion engine. The output state detecting means detects the output state of the internal-combustion engine, based on the reaction torque of the motor detected by the torque detecting means.

20 Claims, 15 Drawing Sheets

OUTPUT STATE DETECTOR FOR INTERNAL COMBUSTION ENGINE

TECHNICAL FIELD

The present invention relates to an apparatus for detecting output state of internal-combustion engine.

BACKGROUND ART

Cars equipped with an engine and a motor-generator (functioning as a motor or as a generator), e.g., so-called hybrid cars are recently available for use. In such hybrid cars, in order to run the engine in the efficient range of the engine revolutions, the engine and the motor-generator are connected via a planetary gear and the motor-generator is controlled to maintain the engine speed (revolutions) at the efficient revolutions.

DISCLOSURE OF THE INVENTION

The inventors found that in the cars having the engine and the motor-generator it was difficult to detect an output state of the internal-combustion engine, based on the angular velocity of rotation thereof, because the motor-generator was designed to control the angular velocity of rotation of the output shaft of the engine to a substantially constant level.

Accordingly, an object of the present invention is to provide output state detecting apparatus that can detect an output state of an internal-combustion engine, in vehicles and others having the internal-combustion engine and the motor.

For example, there is the technique disclosed in Japanese Patent Application Laid-Open No. H02-49955, as a device for detecting misfiring (the output state of the internal-combustion engine) in cylinders of the internal-combustion engine due to trouble in the fuel valve and/or the ignition system. This technique is to detect the angular velocity of rotation of the output shaft of the engine and determine an abnormal cylinder suffering misfiring, based on anomaly of angular velocity. However, since the engine speed is controlled by the motor-generator in the cars having the engine and the motor-generator as described above, it is hard to detect the combustion state (output state), based on the engine speed, as in this technique.

As another technique, the fuel quality is detected in order to run the internal-combustion engine stably and reduce pollutant components in exhaust gas emitted. Since the output of the internal-combustion engine can vary depending upon change of the fuel quality, the fuel quality can be regarded as one of output states of the internal-combustion engine. For example, the device described in Japanese Patent Application Laid-Open No. H09-256898 is known as a fuel quality detecting device. The fuel quality detecting device described in No. H09-256898 is designed to determine the fuel quality, based on change of the engine speed during driving auxiliary accessory devices.

When the fuel quality is heavy and when the fuel attaches, for example, to the internal wall of the intake pipe (intake port) upon a cold start, the attaching fuel becomes resistant to evaporation. Unless the fuel quality is detected and unless fuel injection quantity is corrected based on the result of the detection, the air-fuel ratio will tend to become lean. This will lead to instable output and running states of the internal-combustion engine and/or to increase in the amount of pollutant substances in the exhaust gas.

However, since the engine speed is controlled by the motor-generator in the cars having the engine and the motor-generator (for driving of road wheels and for power generation), variation of engine speed is very small and it is considerably difficult to determine the fuel quality from the variation of engine speed.

An output state detecting apparatus according to the present invention comprises an internal-combustion engine, a generator driven by the internal-combustion engine to generate electric power, torque detecting means for detecting a reaction torque of the generator, and output state detecting means for detecting an output state of the internal-combustion engine, wherein the output state detecting means detects the output state of the internal-combustion engine, based on the reaction torque of the motor detected by the torque detecting means.

Since the motor generates electric power while receiving the output of the internal-combustion engine, the reaction torque of the motor reflects the output of the internal-combustion engine. Therefore, the present invention permits the detection of the output state of the internal-combustion engine based on the reaction torque of the motor.

BEST MODE FOR CARRYING OUT THE INVENTION

Figure 1:
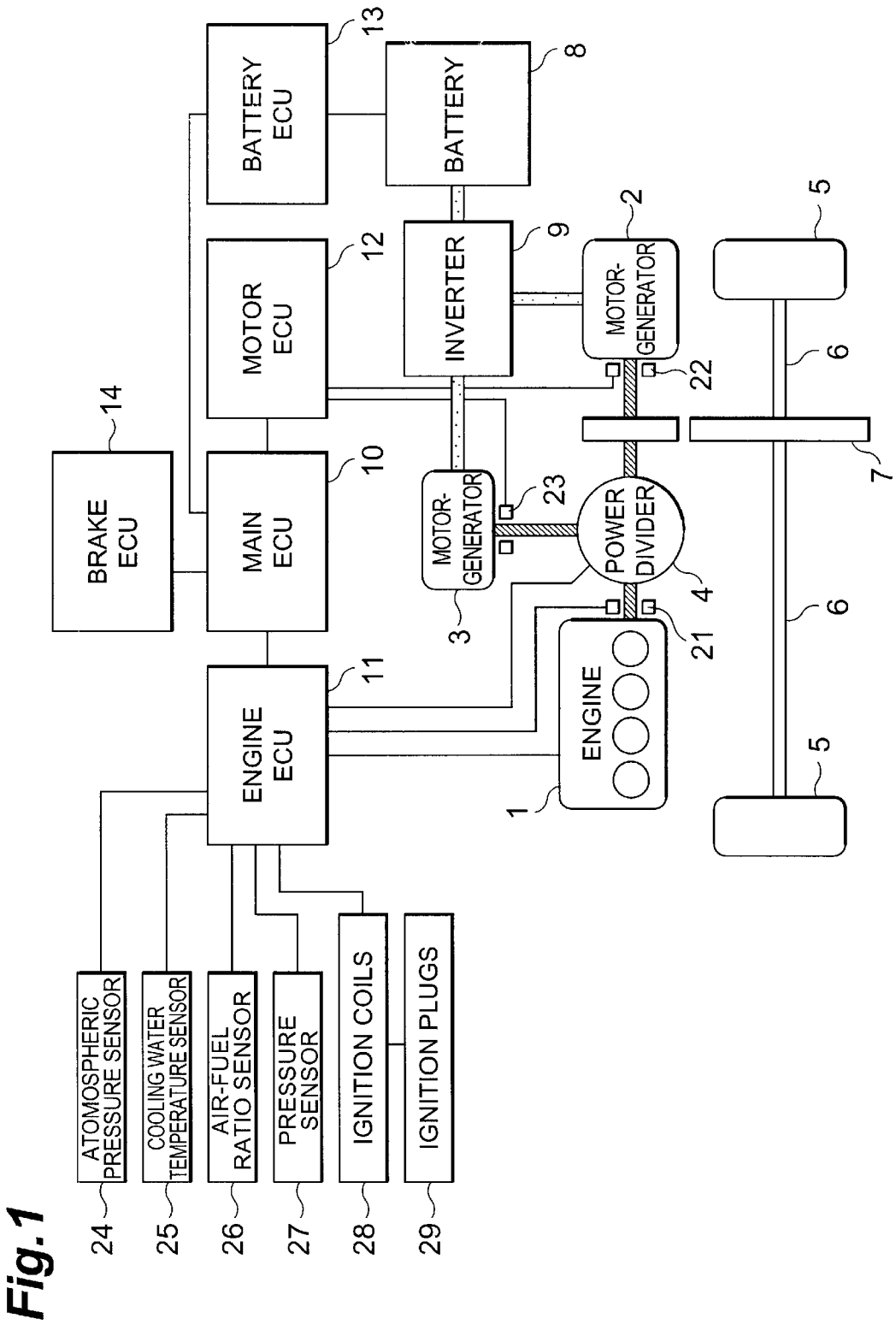
FIG. 1 is a schematic block diagram of main part of a hybrid car equipped with an output state detecting apparatus of internal-combustion engine according to the present invention.

The present invention will be described hereinafter in more detail with reference to the accompanying drawings. FIG. 1 shows the structure of a car having an output state detecting apparatus of the present invention.

This car is a so-called hybrid car having an engine 1 being an internal-combustion engine, and a motor-generator (MG) 2, as its power sources. This car also has a motor-generator (MG) 3 for generating electric power while receiving output of the engine 1. These engine 1, MG 2, and MG 3 are connected to each other by a power divider 4. The power divider 4 divides the output of the engine 1 between MG 3 and drive wheels 5. The power divider 4 also has the function of transmitting output from MG 2 to the drive wheels 5 and the function as a transmission (gear ratio changer) of drive force which is transmitted via reduction unit 7 and drive shaft 6 to the drive wheels 5. The power divider 4 will be detailed later.

MG 2 is an AC(alternating-current) synchronous motor and is driven by AC power. An inverter 9 converts electric power charged in battery 8 from DC to AC to supply AC power to MG 2, and also converts the electric power generated by MG 3 from AC to DC to charge it in the battery 8. Basically, MG 3 also has the structure almost identical to the structure of MG 2 and thus has the structure as an AC synchronous motor. MG 2 mainly functions to output the drive power, while MG 3 mainly functions to generate the electric power while receiving the output of the engine 1.

Although MG 2 mainly functions to generate the drive power, it can also generate electric power (regenerative power generation) by making use of rotation of the drive wheels 5 and thus can also function as a generator. At this time, the brake (regenerative brake) is applied to the drive wheels 5 and thus it can be used in combination with the foot brake (oil brake) and engine brake to stop the car. On the other hand, MG 3 mainly functions to generate the electric power while receiving the output of the engine 1, but can also function as an electric motor that receives the power from the battery 8 through the inverter 9 to drive.

The crankshaft 15 of engine 1 is equipped with a crank position sensor 21 for detecting the piston positions and the rotational speed of engine 1. The crank position sensor 21 is connected to engine ECU 11. On each of drive shafts of MG 2 and MG 3, a rotation sensor (resolver) 22, 23 is mounted to detect the rotational position and speed of each MG. The rotation sensors 22, 23 are connected each to motor ECU 12.

Figure 2:
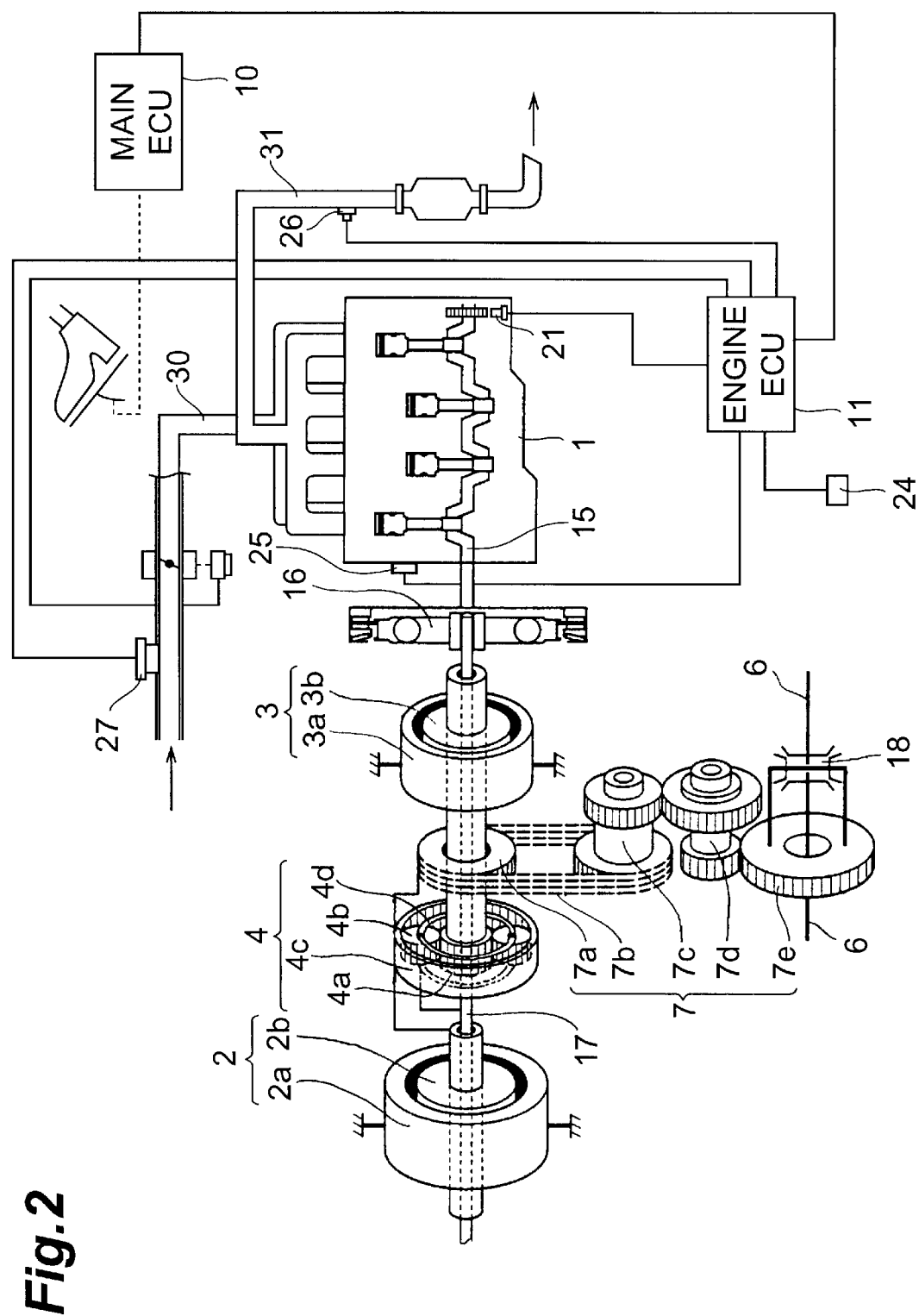
FIG. 2 is a schematic, structural diagram of a dividing mechanism in the apparatus of FIG. 1.

The power divider 4 described above is shown together with the engine 1, MG 2, and MG 3 in FIG. 2. Since the power divider 4 herein is comprised of a planetary gear unit, the power divider 4 will also be called hereinafter planetary gear unit 4. The planetary gear unit 4 is composed of a sun gear 4a, planetary gears 4b disposed around this sun gear 4a, a ring gear 4c disposed further outside the planetary gears 4b, and a gear carrier 4d holding the planetary gears 4b.

Here the crankshaft 15 of engine 1 is coupled through damper 16 to a center shaft 17 and this center shaft 17 is coupled to the gear carrier 4d. Namely, the output of engine 1 enters the gear carrier 4d of the planetary gear unit 4. MG 2 has a stator 2a and a rotor 2b inside and this rotor 2b is coupled to the ring gear 4c. The rotor 2b and ring gear 4c are further coupled to a first gear 7a of the reduction unit 7.

The reduction unit 7 consists of first gear 7a, torque transfer chain 7b, second gear 7c, third gear 7d, and final gear 7e. Namely, the output of motor 2 is supplied to the ring gear 4c of the planetary gear unit 4 and is transmitted through the reduction unit 7 and differential gear 18 to the drive shaft 6. Consequently, MG 2 is always connected to the axle shaft 6.

MG 3, similar to MG 2, has a stator 3a and a rotor 3b inside, and this rotor 3b is coupled to the sun gear 4a. Namely, the output of engine 1 is divided by this planetary gear unit 4 to be supplied through the sun gear 4a to the rotor 3b of MG 3. The output of engine 1 is divided by this planetary gear unit 4 to be able to be transmitted through the ring gear 4c etc. to the drive shaft 6, too.

Here the whole of planetary gear unit 4 can be used as a continuously-variable transmission by controlling the rotation of the sun gear 4a, based on control of power generated by MG 3. Namely, the output of engine 1 or (and) MG 2 is first subjected to speed conversion in the planetary gear unit 4 and is then supplied to the drive shaft 6. It is also feasible to control the engine speed of the engine 1 by controlling the power generated by MG 3 (or power consumption when MG3 functions as a motor). In this example, control is made to maintain the rotational speed of engine 1 in the range of good energy efficiency.

Figure 3:
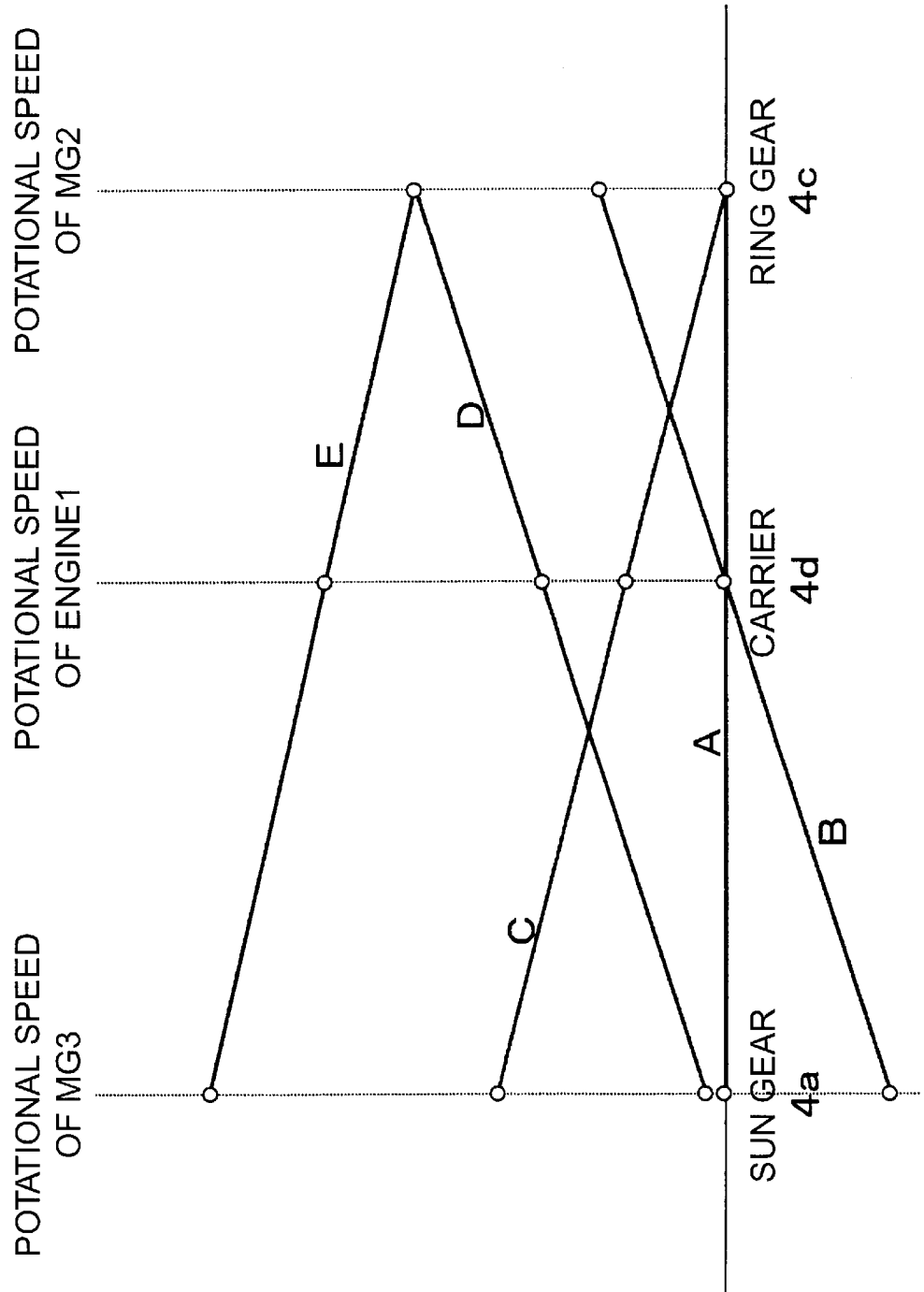
FIG. 3 is an alignment chart to show the relation among rotational speeds of components in the power dividing mechanism of FIG. 2.

FIG. 3 is an alignment chart to show a balance among rotational speeds and directions of the respective gears in the planetary gear unit 4 (i.e., rotational speeds and directions of the engine 1, MG 2, and MG 3 connected to the respective gears). Here the vertical axis represents the rotational speeds of the respective gears (sun gear 4a, ring gear 4c, and gear carrier 4d), i.e., the rotational speeds of the engine 1, MG 2, and MG 3. On the other hand, the horizontal axis represents the gear ratio of the gears. Where a ratio of the number of teeth of the sun gear 4a to the number of teeth of the ring gear 4c is ρ, the axis corresponding to the gear carrier 4d in FIG. 3 is located at a coordinate position obtained by internal division between the axes of the sun gear 4a and the ring gear 4c at the ratio of 1:ρ. Then the following relation is met by the rotational speed Ne of the engine 1 and the gear carrier 4d, the rotational speed Nm of MG 2 and the ring gear 4c, and the rotational speed Ng of MG 3 and the sun gear 4a.

$$N_g = N_m - (N_m - N_e)\frac{1+\rho}{\rho} \qquad (1)$$

During a standstill of the engine 1 in a car stop state MG 2 and MG 3 are also at a standstill and are thus in the state indicated by a line A in FIG. 3. During a starting period or during a low speed cruise, the property of MG 2 capable of generating high torque in a low rotation condition is utilized and the engine 1 is kept at a standstill, whereby only MG 2 is operated by the power from the battery 8 to drive the car (line B). In the hybrid cars, immediately after the starter key is turned on, the engine 1 is activated for a certain period even in the car stop condition for the purpose of warm-up of catalyst. During the engine start period in this car stop condition MG 2 is at a standstill and MG 3 is used as a starter to activate the engine 1, thereby implementing the engine starting (line C).

During a constant speed cruise the power of engine 1 is mainly utilized to drive the car, MG 3 is little rotated (it generates almost no power), and MG 2 is activated if necessary to assist the driving force (line D). During a high-load cruise, e.g., during acceleration from the constant speed cruise, the speed of engine 1 is increased and MG 3 generates power to increase the assist force of MG 2, thereby implementing operation making use of the driving forces of the engine 1 and MG 2 (line E). During a braking period and during deceleration MG 2 generates regenerative power with converting kinetic energy into electric power. On such occasions that the charge of the battery 8 is low, the engine 1 is activated even during a low-load cruise whereby MG 3 generates electric power by utilizing the output of engine 1, thereby charging the battery 8 through the inverter 9.

The control of rotational speeds of MG 2, MG 3 is implemented in such a way that the motor ECU 12 controls the inverter 9 with reference to the output of the rotation sensors 22, 23. This also permits control of the rotational speed of the engine 1.

These control operations are performed by some electronic control units (ECUs) (see FIG. 1). The drive by the engine 1 and the electric drive by MG 2 and MG 3, characteristic of the hybrid car, are generally controlled by the main ECU 10. The main ECU 10 makes a balance between the drive by the engine 1 and the electric drive by MG 2 and MG 3 so as to optimize energy efficiency and issues each control command to control the engine 1, MG 2, and MG 3, to the engine ECU 11 and to the motor ECU 12.

The engine ECU 11 and motor ECU 12 also transmit information on the engine 1, MG 2, and MG 3 to the main ECU 10. Also connected to the main ECU 10 are a battery ECU 13 for controlling the battery 8 and a brake ECU 14 for controlling the brakes. The battery ECU 13 monitors the charge condition of the battery 8, and if the charge becomes short it will issue a charge request command to the main ECU 10. Receiving the charge request, the main ECU 10 performs control of making the generator 3 generate electric power to charge the battery 8. The brake ECU 14 takes charge of braking of the car and, together with the main ECU 10, controls the regenerative brake by MG 2.

When neither of the output torque Te of the engine 1, the output torque Tm of MG 2, and the reaction torque Tg by power generation of MG 3 is null and when they are in balance (in a steady state), the following relations are met.

$$T_m = \frac{1}{1+\rho}T_e \quad (2)$$

$$T_g = -\frac{\rho}{1+\rho}T_e \quad (3)$$

The reaction torque described above is a reaction caused by MG 3 during power generation. Since Tg normally acts in the reverse direction to Te and Tm, it takes negative values.

When the three torques are out of balance on the other hand, the rotational speed of each component varies according to a difference from torque in a balanced state. At this time, where $\omega e$ represents the angular velocity of rotation of the engine 1, $\omega g$ the angular velocity of rotation of MG 3, and Ie and Ig their moments of inertia including gears, the following equation holds.

$$T_e = I_e\frac{d\omega_e}{dt} + \frac{1+\rho}{\rho}\left(I_g\frac{d\omega_g}{dt} - T_g\right) \quad (4)$$

For the moments of inertia Ie, Ig numerical values thereof are preliminarily obtained by experiments and stored in ROM in the main ECU 10, and the values are taken out of the ROM to be used. The angular velocity $\omega e$ of rotation of the engine 1 is detected by the crank position sensor 21. The angular velocity $\omega g$ of rotation of MG 3 is detected by the rotation sensor 23.

Figure 4:
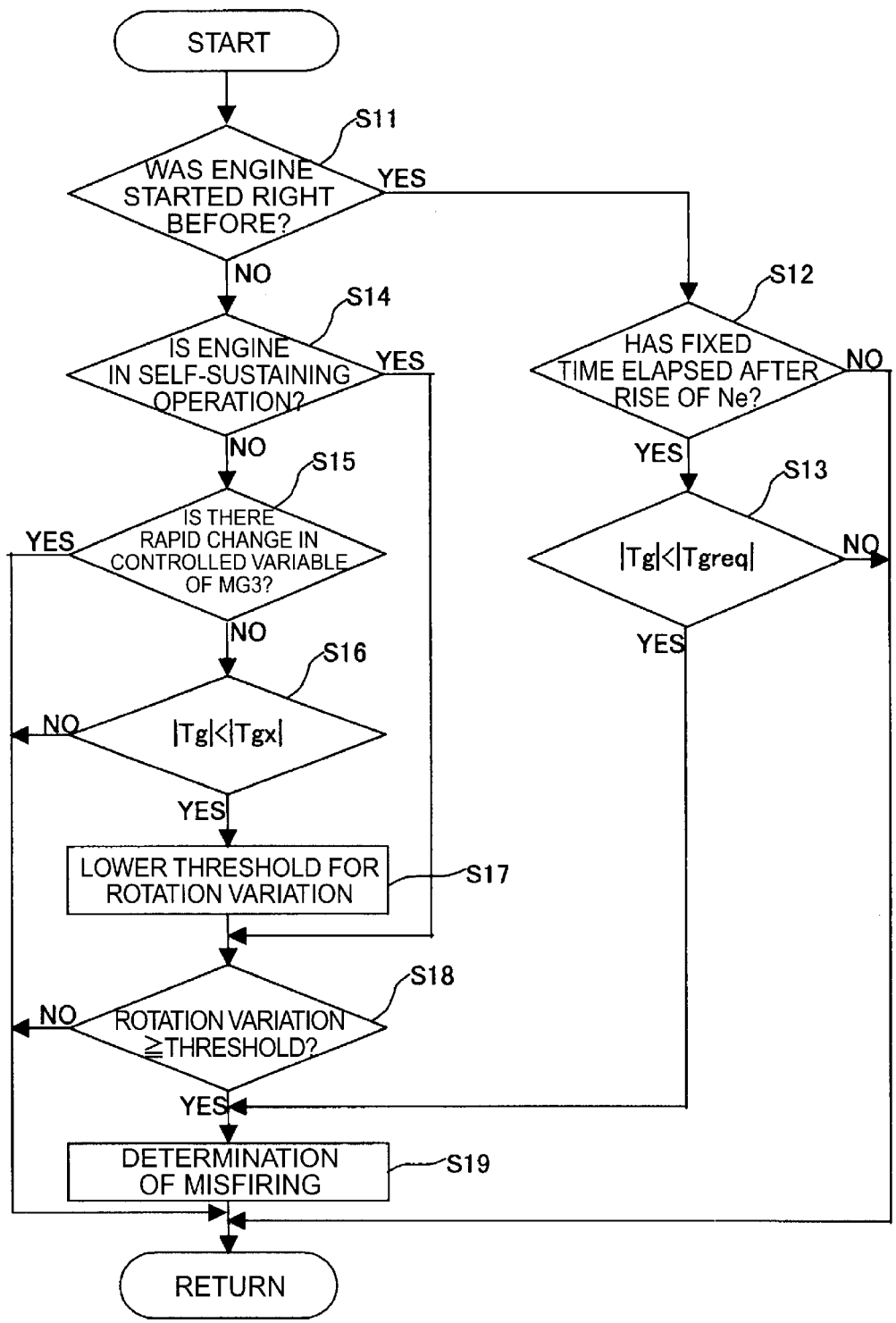
FIG. 4 is a flowchart to show combustion state detecting operation of the output state detecting apparatus of internal-combustion engine according to the present invention.

The output state detecting operation of the engine 1 in the hybrid car of the structure described above will be described below. First described is a case of detecting a combustion state as an output state of the internal-combustion engine. FIG. 4 is a flowchart of this combustion state detecting operation. The processing based on this flowchart is carried out only during operation of the engine 1.

In step S11 it is first determined whether the engine was started immediately before the present time. When the present time is within a predetermined period from the start, the flow transfers to step S12 to determine whether a fixed time has elapsed since a rise of the engine speed Ne. The reason is that during the period before a sufficient rise of the engine speed Ne or during a short period after the rise, warming-up is under way or MG 3 is working as a starter to rotate the engine 1, and combustion in the engine 1 is not stable yet, thus requiring no judgment on misfiring. Therefore, before a lapse of the fixed time, the processing thereafter is skipped to end the operation.

After a lapse of the fixed time, the flow moves to step S13 to compare the detected reaction torque Tg of MG 3 with balanced reaction torque Tgreq. The balanced reaction torque Tgreq is a reaction torque that, in such an operating state of the engine 1 as to output an engine required torque Tereq requested of the engine 1, is generated by MG 3 in a balanced state with the required torque Tereq. This will be detailed below.

The main ECU 10 calculates the respective required torques Tereq, Tmreq of the engine 1 and MG 2 with reference to vehicle speed, battery capacity, auxiliary output, etc. at that point, based on driver's operation on the accelerator pedal. Further, the ECU determines the respective rotational speeds Ne, Nm of the engine 1 and MG 2 to meet these required torques Tereq, Tmreq. At this time the ECU also determines the rotational speed Ng of MG 3 from Eq (1). Then the main ECU 10 controls the motor ECU 12 to control amplitudes and frequencies of electric currents flowing through the inverter 9 to MG 2, MG 3, thereby regulating the rotational speeds Nm, Ng of MG 2, MG 3. By this control the rotational speed of the engine 1 can also be adjusted to a predetermined rotational speed.

At this time, if the combustion state of the engine 1 is stable, the actual output torque Te of the engine 1 will agree with the required torque Tereq. However, if the combustion state of the engine 1 is unstable with misfiring or the like, the actual output torque Te will become lower than the required torque Tereq. At this time, an absolute value of the reaction torque Tg of MG 3 becomes smaller than an absolute value of the balanced torque Tgreq with the required torque Tereq of the engine 1.

Accordingly, whether a judgment on misfiring is feasible or not is judged by comparison between them. The reaction torque Tg can be calculated from the rotational speed of MG 3 measured by the rotation sensor 23 and the electric power generated by MG 3. Alternatively, MG 3 may be provided with a torque sensor. When the absolute value of the reaction torque Tg calculated from the rotational speed of MG3 and the generated power by MG 3 is smaller than the absolute value of the balanced reaction torque Tgreq in balance with the required torque Tereq of the engine 1, the flow moves to step S19 to determine that misfiring occurred; otherwise, the processing thereafter is skipped to end the operation.

If a sufficient time has elapsed since the start of the engine 1, the flow transfers to step S14 to determine whether the engine is under self-sustaining operation. Here the self-sustaining operation of the engine is a state in which the rotational speed of the engine 1 is not controlled by MG 3, and the speed of engine 1 is controlled by the engine ECU 11 as in the case of the engines mounted on common cars.

Since the processing in the following steps S15 to S17 is specific processing carried out during the control of rotational speed of engine 1 by MG 3, these procedures are skipped during the self-sustaining operation of the engine to jump the step S18.

When the engine 1 is not under the self-sustaining operation, the flow moves to step S15. In step S15, a judgment is made on a controlled variable in the control of the rotational speed of MG 3. For example, in use of PID control, a judgment is made on a change of controlled variable of the component P. When the controlled variable of the component P exhibits a rapid change, the status is that a rapid change is also made in the rotational speed of MG 3 and, in turn, in the rotational speed and output torque of the engine 1 per se. When the controlled variable of the component P demonstrates a rapid change, variation is great in the rotational speed of MG 3 (i.e., in the rotational speed and output torque of the engine 1). For this reason, regardless of presence/absence of misfiring, the variation cannot be used for the judgment on misfiring. Accordingly, when the controlled variable exhibits a rapid change, the processing thereafter is skipped. The misfire judgment is not done. When the change of the controlled variable is small, the flow transfers to step S16.

In step S16 the reaction torque Tg is compared with a threshold Tgx. With occurrence of misfiring, as described previously, the absolute value of the output torque Te of the engine 1 becomes smaller and the absolute value of the reaction torque Tg of MG 3 also becomes smaller. Therefore, when the absolute value of the reaction torque Tg is smaller than the absolute value of the threshold Tgx, it is determined that the possibility of misfiring is high and the flow goes to step S17; otherwise, it is determined that the combustion state is stable, and the processing thereafter is skipped. Here the threshold Tgx can be calculated based on Eq (3) if the rotational speeds of the engine 1 and MG 3 are stable (in a steady state) or based on Eq (4) if the rotational speeds of the engine 1 and MG 3 are changing (in a transient state).

When step S16 ends in yes with the judgment of the high possibility of misfiring, the rotational speed of the engine 1 is referenced in step S17 and step S18 in order to make a better judgment on presence/absence of misfiring. At this stage, the engine 1 is not in the self-sustaining operation and the rotational speed thereof is controlled by MG 3. Thus the engine 1 is in a state in which variation of rotation is small due to misfiring. For this reason, in step S17 the threshold for the rotation variation used in the judgment in next step S18 is set to a value lower than the threshold during the self-sustaining operation of the engine.

Next, the processing in step 18 is carried out as follows. First, in step S18 after yes of step S14, it is determined whether the rotation variation is not less than the threshold of rotation variation for the self-sustaining operation of the engine 1. When the rotation variation is not less than the threshold, the flow moves to step S19 to make a judgment of misfiring.

On the other hand, in step S18 after yes of step S16 and after the change of the rotation variation threshold in step S17, it is determined whether the rotation variation is not less than the rotation variation threshold for the engine 1 not being in the self-sustaining operation. When the rotation variation is not less than the threshold, the flow transfers to step S19 to make a judgment of misfiring. If the frequency of occurrence of misfiring is high in comparison with the number of cycles of the engine 1, the main ECU 10 displays the fact in a meter display system and terminates the processing.

The determination process of step S16 may be replaced by a determination process similar to step S13. Since the determination process of step S13 is to make a judgment based on the required torque Tereq of the engine 1, it has the advantage of capability of making stable determination from immediately after the start of engine 1.

The above operation is arranged to determine in step S14 whether the engine 1 is now under the self-sustaining operation, but the operation may be modified so that the engine 1 is forced into the self-sustaining operation at every predetermined time or in a cycle after detection of misfiring. In these cases, since the control of the rotational speed of the engine 1 by MG 3 is terminated, the misfiring of the engine 1 can be detected based on only the variation in rotation.

During the control of rotation of the engine 1 by MG 3, the judgment on misfiring may be made, not using the rotation variation of the engine 1, but using only the detection of the torque variation in step S16 or in step S13. When instable combustion, though not leading to complete misfiring, occurs continuously, shortage of torque appears noticeable whereas the variation in the speed of engine 1 is small. Such continuous instable combustion can be detected by detecting the variation in torque.

The apparatus may be configured to store in the main ECU 10 a map of thresholds Tgx of reaction torque according to rotational speeds Ne of the engine 1 and rotational speeds Ng of MG 3 during constant speed cruises and perform the determination process of step S16 using this map. Likewise, the apparatus may be arranged to correct these values of the map during acceleration/deceleration to obtain the threshold Tgx and carry out the determination process based thereon.

When the engine 1 is not in the self-sustaining operation, the rotation variation of the engine 1 is relieved by the control by MG 3. Therefore, if the same threshold of rotation variation as that in the self-sustaining operation were used, a judgment could not be made even with occurrence of misfiring. In the present invention, the threshold for the judgment on the rotation variation of the engine 1 is lowered in that case whereby an accurate judgment can be made even under the relieved condition. Since the rotation variation of engine 1 responds quicker to occurrence of misfiring than the torque variation, the accuracy is higher for detection of a single misfire. Accordingly, it is preferable to use the both, but only either one of them may also be used for the judgment on misfiring.

The various thresholds, e.g. Tgx, Tgreq, the threshold for rotation variation, etc., vary depending upon the atmospheric pressure, cooling water temperature of the internal-combustion engine, intake air flow, engine speed, air-fuel ratio, ignition timing, fuel quality, electric power generated by the generator or output of the generator, and so on. It is thus preferable to change the thresholds, using one or a combination of these as a parameter. This makes it feasible to make the accurate misfiring determination, regardless of the operational status. When the power divider such as the planetary gear 4 as described above is employed, a power division state of the power divider may also be added to the above parameters.

The atmospheric pressure is detected by an atmospheric pressure sensor 24. The cooling water temperature is detected by a cooling water temperature sensor 25 mounted on the engine 1. The intake air flow is detected from the pressure in the intake pipe, which is detected by a pressure sensor 27 mounted on the intake pipe 30. Alternatively, the intake air flow may be detected by an air flow meter mounted on the intake pipe 30 of the engine 1. The engine speed is detected by the crank position sensor 21. The air-fuel ratio is detected by an air-fuel ratio sensor 26 provided on the exhaust pipe 31 of the engine 1.

Since ignition of ignition plugs 29 of the engine 1 is implemented by sending ignition signals from the engine ECU 11 to ignition coils 28, the ignition timing can be detected by the ECU 11, based on the output of the crank position sensor 21. The detection of the fuel quality will be detailed later. The generated electric power or output of MG 3 is detected by the motor ECU 12. The power division state can be detected by the engine ECU 11 controlling the driving state of the planetary gear unit 4.

As described above, the output torque Te of the engine 1 can be calculated from the reaction torque Tg of MG 3, by making use of the predetermined relations such as Eqs (3), (4) between the output torque Te of the engine 1 and the reaction torque Tg of MG 3. If there occurs a change in the combustion state due to misfiring or the like, the output torque Te of the engine 1 will vary. Therefore, the combustion state can be determined from the change in the output torque Te of the engine 1 and the combustion state can be eventually determined from the reaction torque Tg of MG 3.

The change in the combustion state leads to change in the speed of the engine 1. When the combustion state varies from the normal combustion state, the output torque Te of the engine 1 differs even at the same rotational speed. Accordingly, the determination can be made more accurately by also using the speed of the engine 1 for the determination of the combustion state.

Since the output torque Te of the engine 1 varies according to the speed of the engine 1, the control over the output torque Te of the engine 1 can be performed by controlling the speed of the engine 1. A target value (required torque Tereq) of the output torque Te on the engine 1 side at this time can be calculated from the controlled speed. Then the actual output torque Te of the engine 1 can be calculated from the reaction torque Tg of MG 3 as described previously. In the normal combustion state the actual output torque Te agrees with the required torque Tereq, but with occurrence of abnormal combustion the actual output torque Te will become smaller than the required torque Tereq. For this reason, it is feasible to determine the combustion state by comparing the two torques.

In the self-sustaining state of the engine 1 the rotation of the engine 1 is free of control from the outside of the engine. Therefore, change in the combustion state of the engine 1 results in variation in the speed of the engine 1, and it thus becomes feasible to determine the combustion state from only the variation in the speed of the engine 1.

If there is a difference in the various parameters affecting the operational state of the engine 1, e.g., in the atmospheric pressure, cooling water temperature of engine 1, intake air flow, engine speed, air-fuel ratio, ignition timing, fuel quality, electric power generated by MG 3, output of MG 3, etc., the output torque yielded will differ even at the same rotational speed. Since tolerances also vary for stability of combustion, it becomes feasible to finely adapt for the difference of the operational state, by changing the various thresholds such as Tgx, Tgreq, the threshold for rotation variation, etc. upon the determination.

When a controlled variable in the speed control of the engine 1 is not less than a predetermined level, a deviation of the speed Ng of MG 3 is great from the target speed. In this case, a rapid change is seen in the speed Ng of MG 3 and, in turn, in the speed Ne of the engine 1 with execution of control. Then the output torque Te of the engine 1 also exhibits a rapid change therewith. Accordingly, where the determination of the combustion state is made by use of either the speed change or the torque change, it is difficult to accurately detect the change of the combustion state because of the great change in the speed or the torque with the control. Therefore, it is preferable to halt the determination of the combustion state.

While the speed Ng of MG 3 is under the PID control, a large change in the component P means a large deviation of the rotational speed Ng of MG 3 from the target speed. Since the change of the component P can be detected relatively easily, it is preferable in the case of the large change of the component P during the PID control, to assume that the controlled variable in the control of speed of the engine 1 as described above is not less than the predetermined value.

When the control of the speed of the engine 1 by the control of rotation of MG 3 is halted, variation appears in the speed of the engine 1 according to the variation in the combustion state of the engine 1. Accordingly, during the halt of the control over the speed of engine 1 by MG 3, it is feasible to determine the variation in the combustion state from this variation in the speed of the engine 1.

Figure 5:
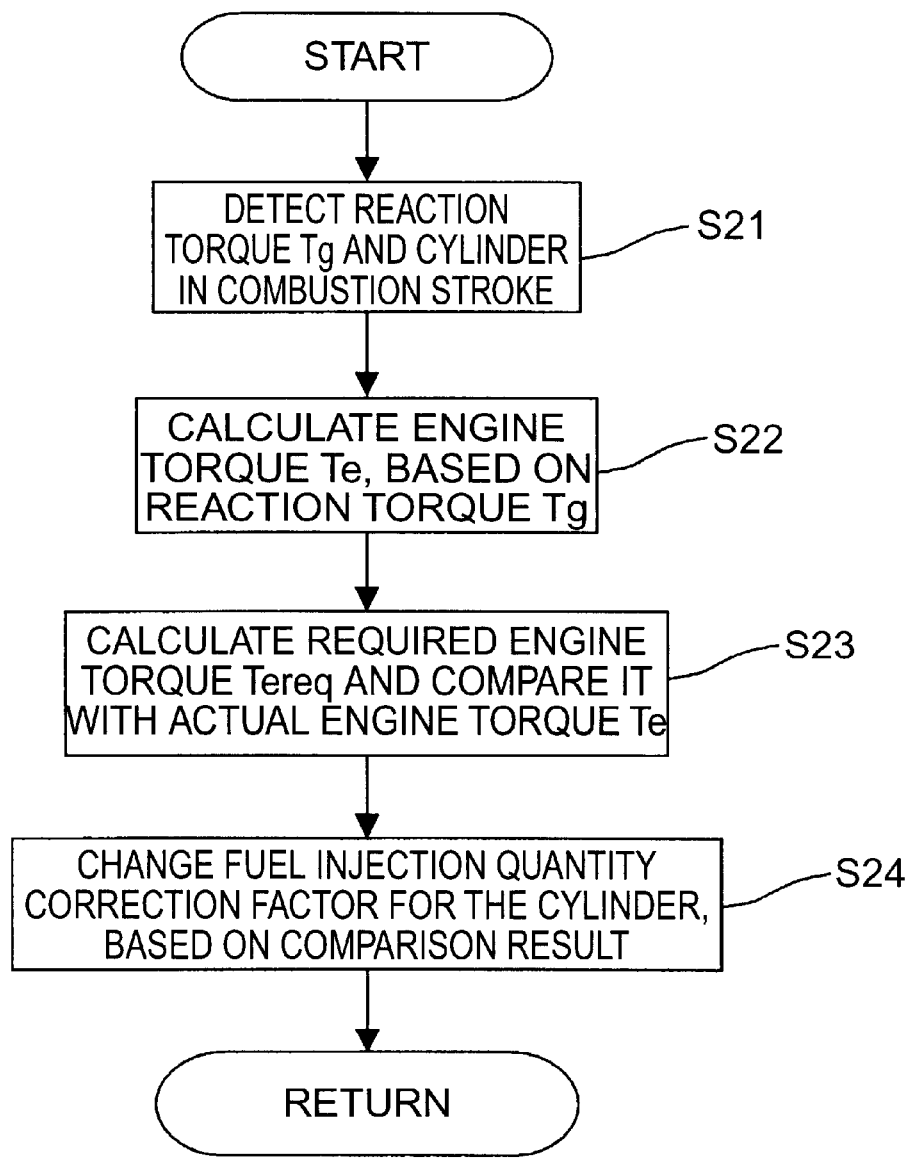
FIG. 5 is a flowchart to show combustion state detecting operation of the output state detecting apparatus of internal-combustion engine according to the present invention.

Next described is a case of detecting the combustion state of each cylinder as an output state of the internal-combustion engine. FIG. 5 is a flowchart of this combustion control operation. The processing based on this flowchart is carried out only during the operation of the engine 1.

First step S21 is a step of detecting the reaction torque Tg and a cylinder in the combustion stroke. Here the reaction torque Tg can be calculated from the speed of MG 3 measured by the rotation sensor and the electric power generated by MG 3, by the motor ECU 12, as described above. optionally, a torque sensor may be mounted on MG 3. The engine ECU 11 can determine the cylinder in the combustion stroke, based on the output of the crank position sensor 21. In step S22 the engine torque Te is then calculated from the reaction torque Tg according to Eq (3) during the steady operation (in the steady state) or according to Eq (4) during variation in the speed of engine 1 (in the transient state).

In subsequent step S23, the actual output torque Te of the engine 1 is compared with the required torque Tereq of the engine 1. The control of the speed of the engine 1 at this time is just the same as described in step S13 in the above-stated case illustrated in FIG. 4. In addition to the control of the speed of the engine 1, the engine ECU 11 also controls a fuel supply so as to realize a predetermined air-fuel ratio in accordance with the required torque Tereq and the engine speed Ne. However, if combustion conditions are different, e.g., if there are variations of fuel supply among the cylinders, there will appear a difference among torques generated in the respective cylinders and this will eventually result in variation in the engine torque.

Figure 6:
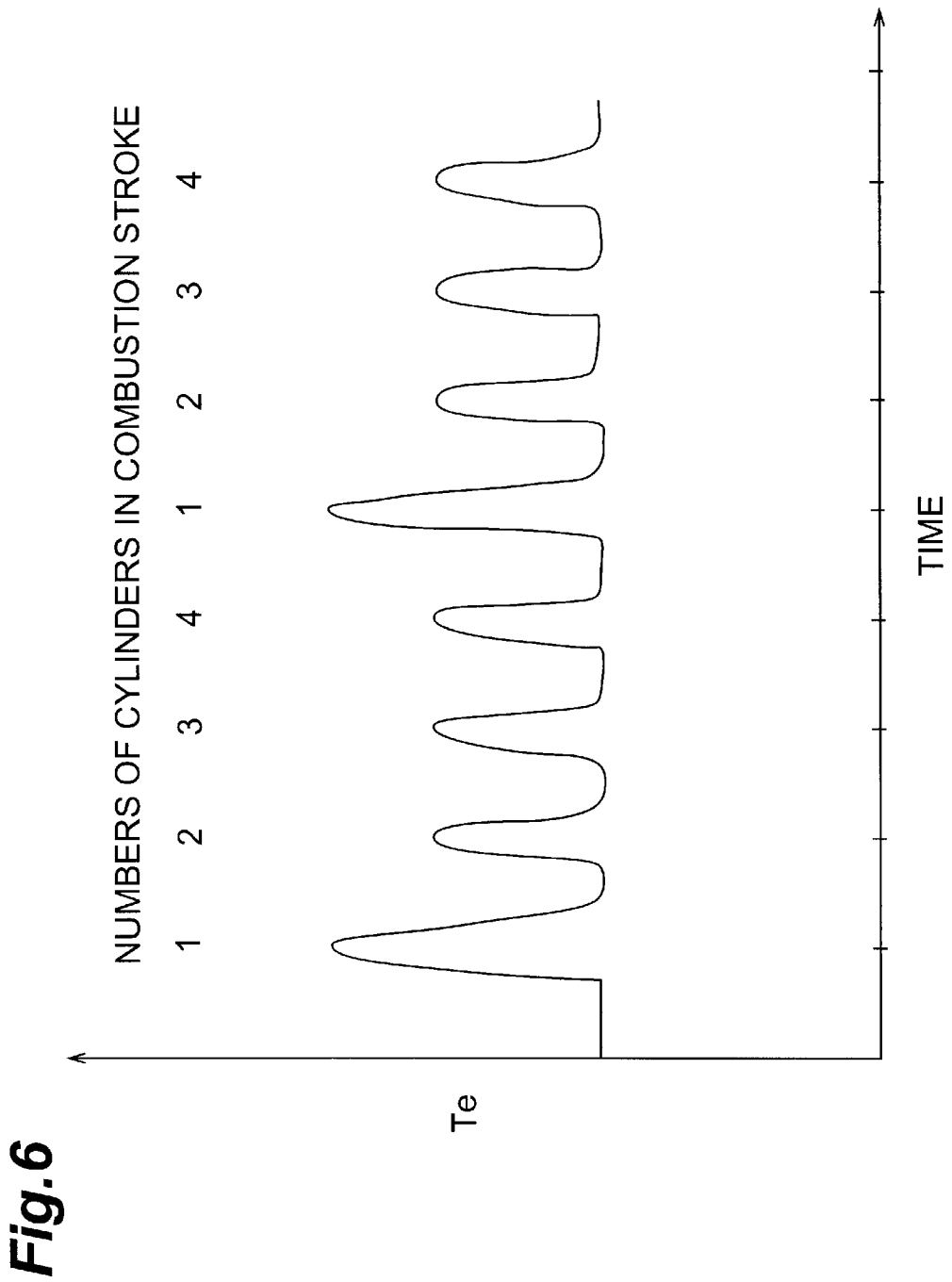
FIG. 6 is a graph to show temporal variation of engine torque.

FIG. 6 shows a temporal change curve of the output torque Te of the engine 1 in a state wherein only the first cylinder in the four-cylinder type engine 1 experiences rich combustion in the steady state. The output torque Te of the engine 1 with the rich-combustion cylinder being in the combustion stroke is larger than those with the other cylinders being in the combustion stroke, i.e., than the required torque Tereq. When lean combustion occurs on the other hand, the output torque Te becomes smaller. Accordingly, it is feasible to determine the combustion state by comparing the required torque Tereq with the actual output torque Te.

When in step S24 it is determined from the comparison result that a certain cylinder is under rich combustion, an fuel injection quantity correction factor of a corresponding fuel injector is reduced so as to decrease the quantity of fuel introduced into the cylinder of interest. When it is determined on the other hand that a certain cylinder is under lean combustion, the fuel injection quantity correction factor of a corresponding fuel injector is increased so as to increase the quantity of fuel introduced into the cylinder of interest. The correction factor may be changed in proportion to the torque difference or stepwise.

By controlling fuel supplies to the respective cylinders so as to decrease the torque variation, the variations are nullified in air-fuel ratios among the cylinders and improvement is made in exhaust emissions, because all the cylinders can be operated in the stoichiometric region.

Described above was the case wherein the actual output torque Te of the engine 1 was estimated from the reaction torque Tg of MG 3 and the control was carried out based on the comparison between this output torque Te and the required torque Tereq. Particularly, since the reaction torque Tg must be constant during the steady operation in which there is no change in the accelerator pedal position, engine speed, and intake air flow, the apparatus may be arranged to determine a cylinder whose reaction torque Tg in the combustion stroke deviates from an average of those in the combustion stroke of the other cylinders and to change the fuel injection quantity correction factor for that cylinder. A change amount of the correction factor at this time can be determined according to the deviation. Further, during the operation with change in the accelerator pedal position, engine speed, and intake air flow, the deviation can also be estimated by referencing reaction torques Tg in the combustion stroke of previous and subsequent combustion cylinders.

The above mainly described the control to adjust the fuel injection quantity, but it is also possible to adjust the intake air flow or to adjust the air-fuel ratio itself by combination of the two parameters. As another example, it is also feasible to control the combustion state cylinder by cylinder, by controlling the fuel injection timing and/or the ignition timing.

In addition to the above, when the car is equipped with an exhaust gas recirculation (EGR) system for recirculating part of exhaust gas to the air intake side, as an example of the combustion condition to be controlled, quantity of recirculated gas may be controlled. When the engine 1 is a lean-burn internal-combustion engine such as a direct injection engine or the like, intake air patterns such as swirling, tumbling, or the like may be controlled. When the engine is an internal-combustion engine equipped with a variable valve timing mechanism, the valve timing may be changed.

As described above, the output torque Te of the engine 1 can be calculated from the reaction torque Tg of MG 3, by making use of the predetermined relations such as Eqs (3), (4) between the output torque of the engine 1 and the reaction torque Tg of MG 3. When the combustion state changes because of misfiring, rich combustion, or the like, the output torque Te of the engine 1 varies. The output torque Te of each cylinder takes a peak value in the combustion stroke. Therefore, the combustion state of each cylinder can be determined from the output torque Te in the combustion stroke. Since this output torque Te can be calculated from the reaction torque Tg of MG 3, it eventually becomes feasible to determine the combustion state of each cylinder from the reaction torque Tg of MG 3 and the cylinder in the combustion stroke.

The control described above makes it feasible to control the combustion state toward a stable state by determining the combustion state of each cylinder and thereafter adjusting the combustion conditions in a cylinder judged as being in an instable combustion state, e.g., by adjusting the air-fuel ratio, fuel injection quantity, fuel injection timing, ignition timing, or intake air flow. This suppresses the torque variation caused by dispersion of combustion states among the cylinders.

Figure 7:
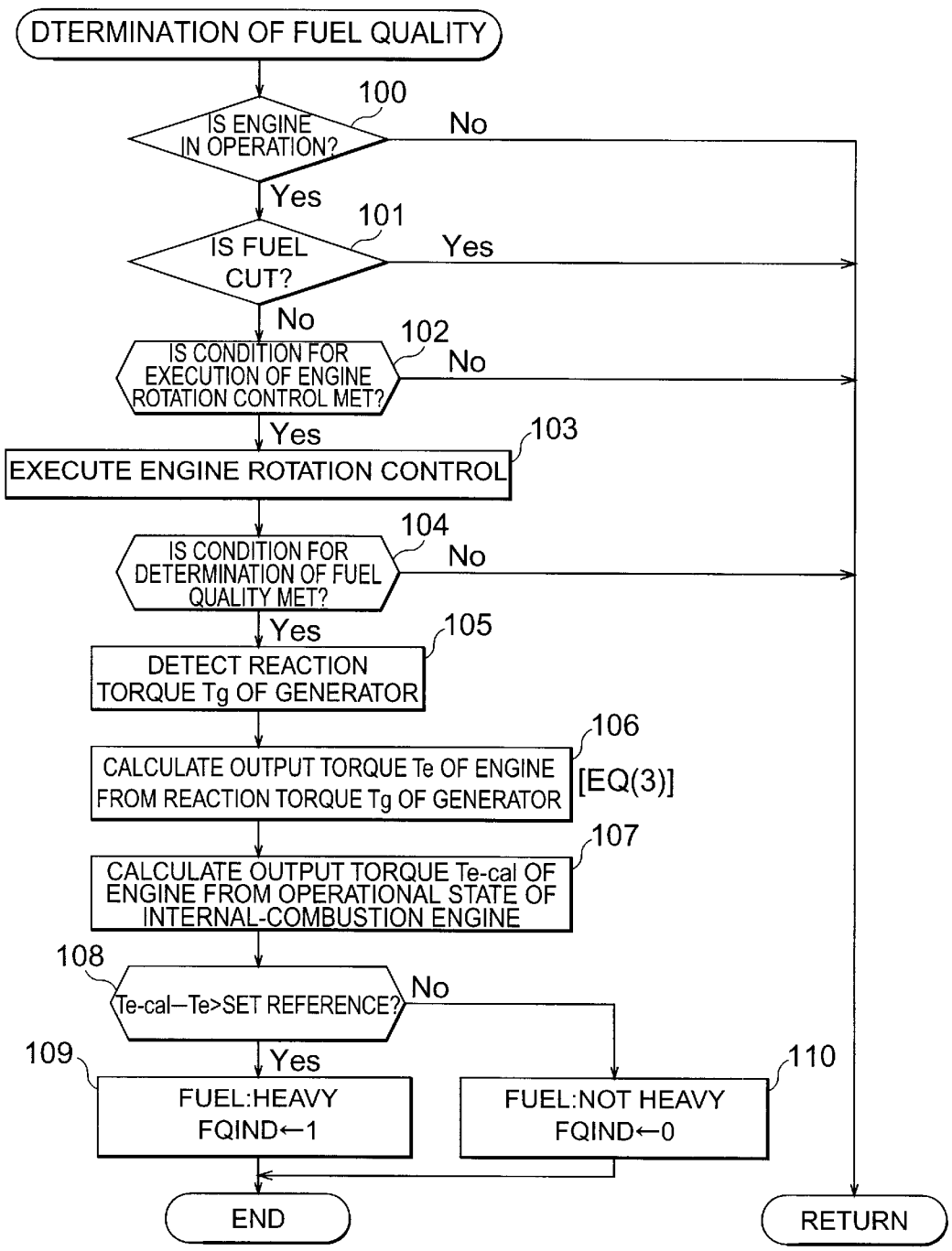
FIG. 7 is a flowchart to show fuel quality detecting operation (in a steady state of the engine) the output state detecting apparatus of internal-combustion engine according to the present invention.

Next described is a case of detecting the fuel quality as an output state of the internal-combustion engine. A flowchart of fuel quality determining processing is provided in FIG. 7. The process of determining the fuel quality will be described below along FIG. 7.

First, it is determined whether the engine 1 is in operation (step 100). The "in operation of engine" stated herein means "under combustion of engine" except during the halt of engine and during cranking. When the engine 1 is in operation, it is then determined whether the engine is in a fuel cut period (step 101). Since during the fuel cut period the fuel to be inspected is not burnt, it is impossible to determine the fuel quality, as a matter of course.

Unless the engine is in a fuel cut period, it is determined whether a condition for execution of engine rotation control is met (step 102). The condition for execution of rotation control is, specifically, that no control is effected over quantity of power generation or discharge of MG 3, that a request for self-sustaining operation (e.g., a request for activation of air conditioner or a request for a rise of cooling water temperature of engine) is not made to the engine 1, or that the vehicle speed of the hybrid car is higher than a predetermined vehicle speed. If the rotation control execution condition is met, the control of engine rotation is executed in order to maintain the speed of engine 1 in a predetermined region (step 103).

It is then determined whether a condition for determination of fuel quality is met (step 104). The condition for determination of fuel quality herein is whether the engine is in a warm-up mode immediately after cold starting. If the fuel quality determination condition is met, the reaction torque Tg of MG 3 is detected (step 105). The reaction torque Tg of MG 3 is calculated from electric power generated, which is read through the inverter 9 and via the motor ECU 12 into the main ECU 10 from the electric power generated by MG 3 (or power consumption when MG 3 is working as a motor), and from the rotational speed of MG 3 detected by the rotation sensor 23.

Then the output torque Te of the engine 1 is calculated using aforementioned Eq (3), from the reaction torque Tg of MG 3 (step 106). Further, the operational state of the engine 1 is also judged based on at least one of the cooling water temperature, intake air flow, engine speed, air-fuel ratio, and ignition timing (or a combination of these), and the output torque Te-cal of the engine 1 is also calculated from this operational state (step 107).

Although the output torque Te-cal was calculated from the operational state of the engine 1 herein, it is also possible to perform control using a fixed value equivalent to the output torque Te-cal, as a torque criterion.

Then a difference is calculated between the output torque Te-cal calculated based on the operational state of the engine 1 and the output torque Te of the engine 1 calculated based on the reaction torque Tg of MG 3, and it is determined whether the difference is greater than a set reference preliminarily set (step 108).

When the difference between output torque Te-cal and output torque Te is larger than the set reference, the fuel quality is heavy and thus it can be determined that the actual output torque Te calculated from the reaction torque Tg of MG 3 is lower than the output torque Te-cal estimated from the operational state of the engine 1. When the fuel is judged as being heavy, a fuel quality index FQIND is set to 1 and stored in a backup RAM in the main ECU 10 (step 109).

On the other hand, when the difference between the output torque Te-cal calculated based on the operational state of the engine 1 and the output torque Te of the engine 1 calculated based on the reaction torque Tg of MG 3 is smaller than the set reference, the fuel is not considered to be heavy and thus the fuel quality index FQIND is set to 0 and stored in the backup RAM in the main ECU 10 (step 110). The fuel quality thus determined is reflected in the operation of the engine 1 hereinafter.

During the determination of the fuel quality, the aforementioned ECUs 10 to 12, together with the other various sensors and various devices, also function as torque detecting means and fuel quality determining means (first torque detecting means and second torque detecting means). The torque detecting means is a means for detecting the reaction torque Tg of MG 3 from its generating power (or its dissipating power when MG 3 is working as a motor) and the rotational speed thereof. The fuel quality determining means is a means for determining the fuel quality (whether the fuel is heavy or not), based on the reaction torque Tg of MG 3 detected. The fuel quality determining means has the first torque detecting means and the second torque detecting means. The first torque detecting means is a means for calculating the output torque Te of the engine 1, based on the reaction torque Tg of MG 3 detected, and the second torque detecting means a means for calculating the output torque Te-cal of the engine 1 from the operational state of the engine 1.

Since the output torque Te of the engine 1 varies depending upon the fuel quality, the fuel quality (whether the fuel is heavy or not) can be determined based on the reaction torque Tg of MG 3. The fuel quality is detected immediately after cold starting herein. The reason is that immediately after the cold starting, differences in attaching amount of fuel on the internal wall of the intake pipe and in evaporating amount of fuel become noticeable depending upon the fuel quality and the change of the output torque of the engine 1 becomes larger because of the difference of the fuel quality, thus facilitating the detection of the change of the output torque. Since it is easier to detect the change of output torque of the engine 1, the fuel quality can be determined more accurately. After the engine 1 becomes fully warm, the temperature of the engine 1 is also sufficiently high and there appears no big difference in the evaporating amount of fuel. For this reason, the fuel quality is detected better immediately after the cold starting.

The processing herein is configured to perform the control to maintain the speed of the engine 1 positively in the predetermined region, as described above. In this configuration, the change of the output torque of the engine 1 can also be estimated through the reaction torque Tg of MG 3 and the fuel quality can be detected accurately.

In order to maintain the speed of the engine 1 in the predetermined region, it is also possible to additionally use control of throttle aperture to control the intake air flow to the engine 1. However, when the reaction torque Tg of MG 3 is used in order to maintain the speed of the engine 1 in the predetermined region, the difference of the fuel quality is reflected in the reaction torque Tg of MG 3 and thus the fuel quality can be determined more accurately. If the fuel quality is intended to be determined from only the speed of the engine 1, execution of the control to maintain the speed in the predetermined region will lead to no change (or very small change) in the rotational speed and thus the determination of the fuel quality will become very difficult.

As described above, the fuel quality is first determined in the steady state immediately after cold starting herein. If the hybrid car is constructed so that when the ignition system is first switched on, the warm-up mode is carried out to operate the engine 1 for a fixed period for warming-up of the engine 1, exhaust-gas cleaning catalyst, etc. and establish the steady state in this warm-up mode, the fuel quality can be determined during this period. The reason why the warming-up of the exhaust-gas cleaning catalyst is carried out is that the common exhaust-gas cleaning catalysts do not exhibit the cleaning function below their activation temperature and thus the warning-up is carried out to increase the temperature of the catalyst to over this activation temperature.

In another case, where a charge request to the battery 8 is present immediately after cold starting, the engine 1 is activated to generate electric power by the generator 3, and the fuel quality can be determined while establishing the steady state in this case. In still another case, it can also be contemplated that a fuel quality determining mode to positively establish the steady state is carried out immediately after cold staring in order to determine the fuel quality.

Since the fuel quality would be maintained without refueling, one determination operation suffices per ignition on. A determination operation can be performed once every several ignition ONs. In another case, it can also be contemplated that the apparatus is arranged to acquire output of a sensor for detecting the residual quantity of fuel and perform the fuel quality determination upon increase of the residual quantity of fuel (i.e., upon refueling). In either of the cases, it is preferable to carry out the determination immediately after cold starting, as described above.

In the example herein, as described above, the output torque of the engine 1 is not calculated only from the reaction torque Tg of MG 3 but is also calculated from the operational state of the engine 1. When the separate output torques of the engine 1 are calculated from the reaction torque Tg of MG 3 and from the operational state of the engine 1, respectively, in this way, the comparison between them makes it feasible to determine the fuel quality more accurately.

Namely, the output torque Te-cal calculated based on the operational state of the engine 1 is an estimated value of output torque considered to be outputted in that operational state. In contrast with it, the output torque Te calculated based on the reaction torque Tg of MG 3 can be regarded as an actual output torque from the engine 1. If there is a deviation between them under comparison, the deviation can be considered to be caused by the fuel quality. This configuration permits the determination with higher accuracy than the determination of the fuel quality simply based on only the reaction torque Tg of MG 3.

Described next is how to reflect the aforementioned determination of fuel quality in the operation of the engine.

In the case of the hybrid car, the vehicle is driven by combination of the output of the engine 1 with the output of MG 2 (or by use of only either one of them in some cases). Therefore, the main ECU 10 generally calculates the driving force necessary for driving the car and thereafter allocates this necessary driving force into required part to the engine 1 and required par t to MG 2. After that, the mai n ECU 10 issues respective drive commands to the engine ECU 11, to the motor ECU 12, and to the battery ECU 13. The operation of the engine 1 based on the drive commands will be described below.

The determined fuel quality is reflected in the fuel injection quantity of the engine 1. Normally, the fuel injection quantity TAU is obtained by correcting a basic injected quantity by various correction factors. The following will describe in order, calculation of upon-starting fuel injection quantity TAU upon starting of the engine and calculation of after-starting fuel injection quantity TAU after starting of the engine.

First, the calculation of the upon-starting fuel injection quantity TAU will be described.

Since the fuel quality is determined in the operating state of the engine 1, a previous detection result of fuel quality is used upon the calculation of the upon-starting fuel injection quantity TAU.

The upon-starting fuel injection quantity TAU is calculated according to Eq (5) below.

$$TAU = TAUST \times KNEST \times KBST \times KPA \qquad (5)$$

In this equation, the upon-starting basic fuel injection quantity TAUST is determined according to the cooling water temperature THW of the internal-combustion engine and the fuel quality, and this upon-starting basic fuel injection quantity TAUST is corrected by various correction factors described below, thereby finally obtaining the upon-starting fuel injection quantity TAU. The upon-starting basic fuel injection quantity TAUST is stored in the form of a map in the ROM in the engine ECU 11.

A speed correction factor KNEST is determined according to the rotational speed NE of the engine 1 and is a correction factor for changing the upon-starting fuel injection quantity TAU according to the speed NE. A battery voltage correction factor KBST is determined according to the battery voltage VB. Since a drop of battery voltage VB results in degradation of performance of the fuel pump, a shortage of fuel due to this degradation of performance is compensated for by the battery voltage correction factor KBST. An atmospheric pressure correction factor KPA is determined according to the atmospheric pressure PA. Since the air density (intake air flow) varies depending upon the atmospheric pressure PA, a change of necessary fuel due to this change of air density is corrected for by the atmospheric pressure correction factor KPA.

Figure 8:
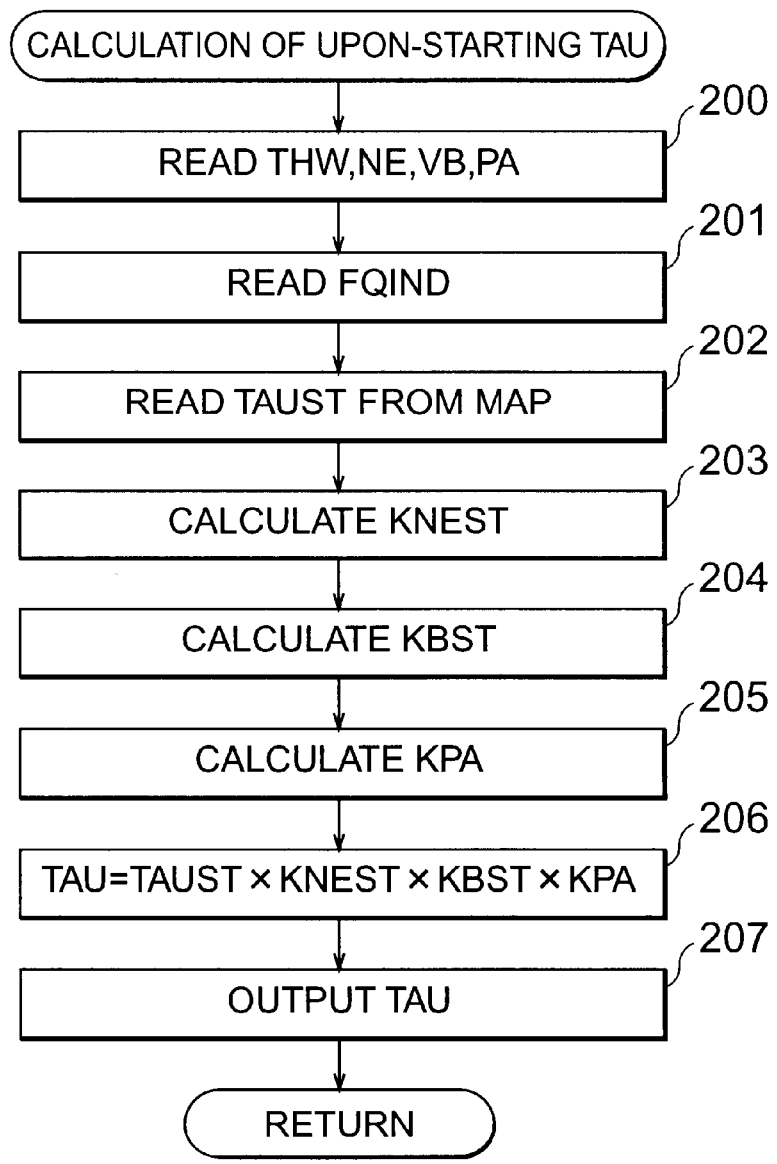
FIG. 8 is a flowchart to show computation processing of fuel injection quantity TAU upon starting.

A flowchart for the calculation of the upon-starting fuel injection quantity TAU is presented in FIG. 8.

First, the cooling water temperature THW, engine speed NE, battery voltage VB, and atmospheric pressure PA are read in from the various sensors (step 200). Then the fuel quality index FQIND indicating the fuel quality is read in from the backup RAM of the engine ECU 11 (step 201). From the cooling water temperature THW and fuel quality index FQIND thus read, the map in the engine ECU 11 is searched to read the upon-starting basic fuel injection quantity TAUST (step 202). Then the speed correction factor KNEST is calculated from the engine speed NE (step 203), the battery voltage correction factor KBST from the battery voltage VB (step 204), and the atmospheric pressure correction factor KPA from the atmospheric pressure PA (step 205).

Using the upon-starting basic fuel injection quantity TAUST read from the map, and the calculated speed correction factor KNEST, battery voltage correction factor KBST, and atmospheric pressure correction factor KPA, the upon-starting fuel injection quantity TAU is calculated from Eq (5) above (step 206). Based on the upon-starting fuel injection quantity TAU thus calculated, the engine ECU 11 outputs a control signal to the injector expected to inject the fuel (step 207). In this way, the upon-starting fuel injection quantity TAU reflects the determined fuel quality (fuel quality index FQIND) through the upon-starting basic fuel injection quantity TAUST.

The calculation of the after-starting fuel injection quantity TAU will be described below.

Immediately after the engine 1 is started based on the above-stated upon-starting fuel injection quantity TAU, another detection of fuel quality must be carried out. The after-starting fuel injection quantity TAU is calculated based on the fuel quality newly determined immediately after the starting of the engine 1.

When the engine speed NE exceeds a predetermined value after starting of the engine 1, the after-starting fuel injection quantity TAU is calculated according to the following equation.

$$TAU = TP \times (1 + FWLOTP) \times FAF + FMW \qquad (6)$$

In this equation, a basic fuel injection quantity TP is determined according to the intake air flow Q and the speed NE of the internal-combustion engine and this basic fuel injection quantity TP is corrected by various correction factors described below, thereby finally obtaining the after-starting fuel injection quantity TAU. The basic fuel injection quantity TP is stored in the form of a map in the ROM in the engine ECU 11.

A warm-up and high-load correction factor FWLOTP is a factor for correcting the fuel injection quantity during warming-up or during high-load operation. An air-fuel ratio feedback correction factor FAF is a factor for bringing the air-fuel ratio of the engine 1 to a predetermined target air-fuel ratio, based on the output of the fuel-air ratio sensor 26 mounted on the exhaust pipe 31. A wall-attaching fuel correction factor FMW is determined according to the intake pressure PM and the fuel quality and is a factor for correcting the fuel injection quantity in consideration of a balance between attaching amount of fuel onto the wall surfaces in the intake pipe and the cylinders and detaching amount of fuel from the wall surfaces in the intake pipe and the cylinders. When the operation of the engine 1 is in the transient state, the balance is degraded between the attaching amount of fuel onto the wall surfaces in the intake pipe and the cylinders and the detaching amount of fuel from the wall surfaces in the intake pipe and the cylinders and the fuel injection quantity is thus corrected by the wall-attaching fuel correction factor FMW.

The warm-up or high-load correction factor FWLOTP is a factor for increasing the fuel injection quantity to implement stable combustion, because atomization of fuel becomes poor during warming-up, and for increasing the fuel injection quantity to decrease the exhaust-gas temperature by atomization of fuel, because the exhaust-gas temperature becomes high during high-load operation, and it is calculated according to Eq (7) below.

$$FWLOTP = (FLWB + FLWD) \times KWL + FASE \qquad (7)$$

A warm-up increase correction factor FWLB is determined according to the cooling water temperature THW and the fuel quality and is stored in the form of a map in the ROM in the engine ECU 11. A warm-up increase damping factor FLWD is a factor for gradually damping the increase due to the warm-up or high-load correction factor FWLOTP and factor free of the influence of the fuel quality.

A warm-up increase speed correction factor KWL is determined according to the engine speed NE and is a factor for correcting the increase due to the warm-up or high-load correction factor FWLOTP, according to the speed of the engine 1. The warm-up increase speed correction factor KWL is also a factor free of the influence of the fuel quality. An after-starting increase correction factor FASE is determined according to the cooling water temperature THW and the fuel quality and is a correction factor for increasing the fuel quantity by a quantity shortage due to attachment of fuel to the wall surfaces in the dry intake pipe and cylinders immediately after starting of the engine 1, and is stored in the form of a map in the ROM in the engine ECU 11. The after-starting increase correction factor FASE is gradually damped.

Figure 9:
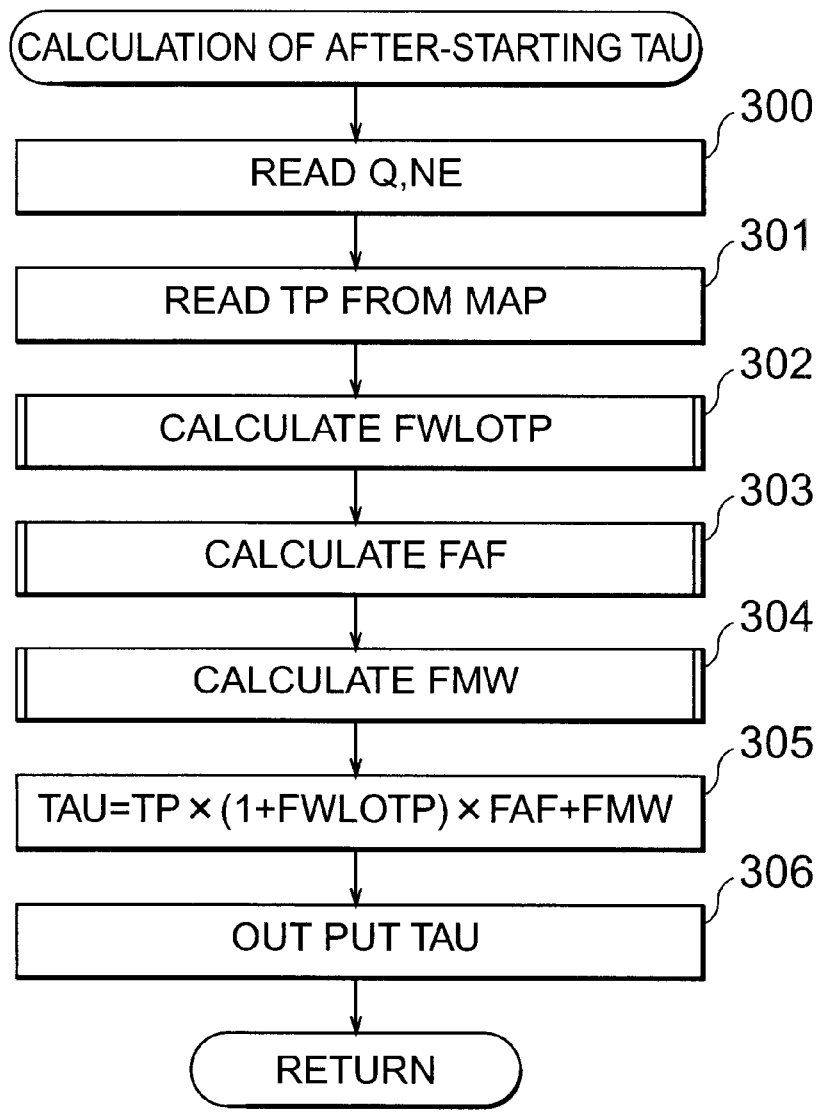
FIG. 9 is a flowchart to show computation processing of fuel injection quantity TAU after starting.

A flowchart for the calculation of the after-starting fuel injection quantity TAU is presented in FIG. 9.

First, the intake air flow Q and engine speed NE are read in from the various sensors (step 300), and from the intake air flow Q and engine speed NE thus read, the map in the engine ECU 11 is searched to read the basic fuel injection quantity TP (step 301). In certain cases the basic fuel injection quantity TP is determined from the intake pressure PM and the engine speed NE. Then the warm-up or high-load correction factor FWLOTP, air-fuel ratio feedback correction factor FAF, and wall-attaching fuel correction factor FMW are calculated in order (steps 302 to 304). The calculation of the warm-up or high-load correction factor FWLOTP, air-fuel ratio feedback correction factor FAF, and wall-attaching fuel correction factor FMW will be described later.

Using the basic fuel injection quantity TP read from the map, and the calculated warm-up and high-load correction factor FWLOTP, air-fuel ratio feedback correction factor FAF, and wall-attaching fuel correction factor FMW, the after-starting fuel injection quantity TAU is calculated from above Eq (6) (step 305). Based on the after-starting fuel injection quantity TAU thus calculated, the engine ECU 11 outputs a control signal to the injector expected to inject the fuel (step 306).

Figure 10:
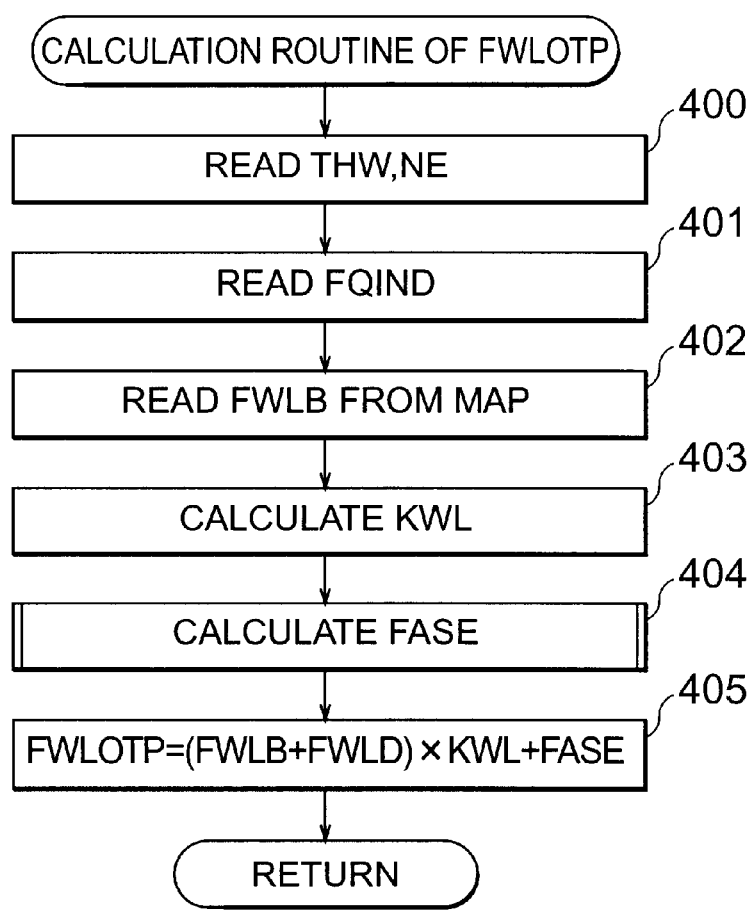
FIG. 10 is a flowchart to show a calculation routine of warm-up and high-load correction factor FWLOTP.

FIG. 10 shows a flowchart for the calculation of the warm-up or high-load correction factor FWLOTP in step 302 described above.

First, the cooling water temperature THW and engine speed NE are read in from the various sensors (step 400). The fuel quality index FQIND indicating the fuel quality is then read in from the backup RAM of the engine ECU 11 (step 401). From the cooling water temperature THW and fuel quality index FQIND thus read, the map in the engine ECU 11 is searched to read the warm-up increase correction factor FWLB (step 402). Then the warm-up increase speed correction factor KWL is calculated from the engine speed NE (step 403) and the after-starting increase correction factor FASE is also calculated (step 404). The calculation of the after-starting increase correction factor FASE will be described later.

Using the warm-up increase correction factor FWLB read from the map, the predetermined warm-up increase damping factor FLWD, and the calculated warm-up increase speed correction factor KWL and after-starting increase correction factor FASE, the warm-up or high-load correction factor FWLOTP is calculated from above Eq (7) (step 405).

Figure 11:
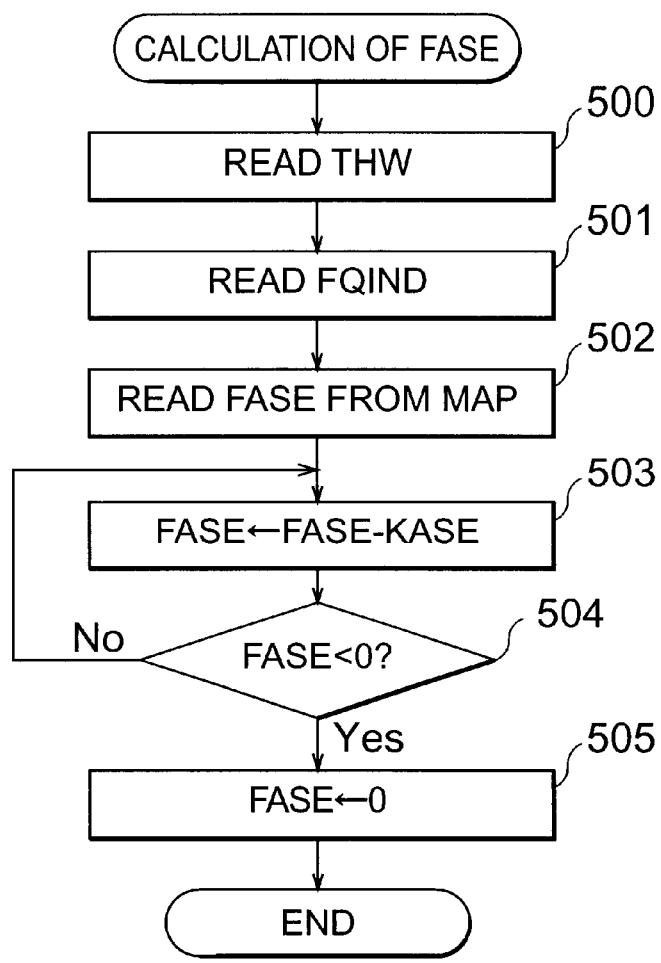
FIG. 11 is a flowchart to show a calculation routine of increase correction factor FASE after starting.

The calculation of the after-starting increase correction factor FASE in step 404 described above is presented in FIG. 11.

First, the cooling water temperature THW is read in from the sensor (step 500), and the fuel quality index FQIND indicating the fuel quality is read in from the backup RAM of the engine ECU 11 (step 501). From the cooling water temperature THW and fuel quality index FQIND thus read, the map in the engine ECU 11 is searched to read the after-starting increase correction factor FASE (step 502). The after-starting increase correction factor FASE read from the map is gradually damped using the predetermined after-starting increase damping factor KASE (steps 503, 504). If in step 504 the after-starting increase correction factor FASE damped becomes negative, the after-starting increase correction factor FASE is set to 0 (step 505).

Figure 12:
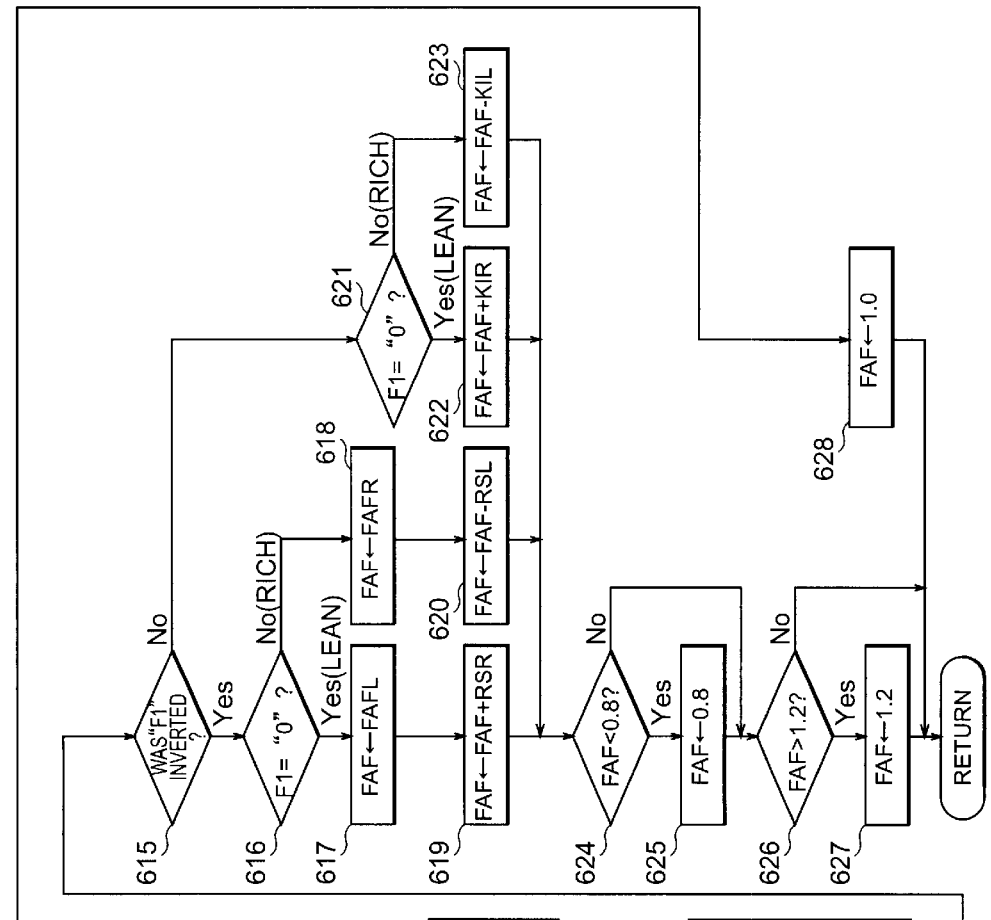
FIG. 12 is a flowchart to show a calculation routine of air-fuel ratio feedback correction factor FAF.
Figure 12:
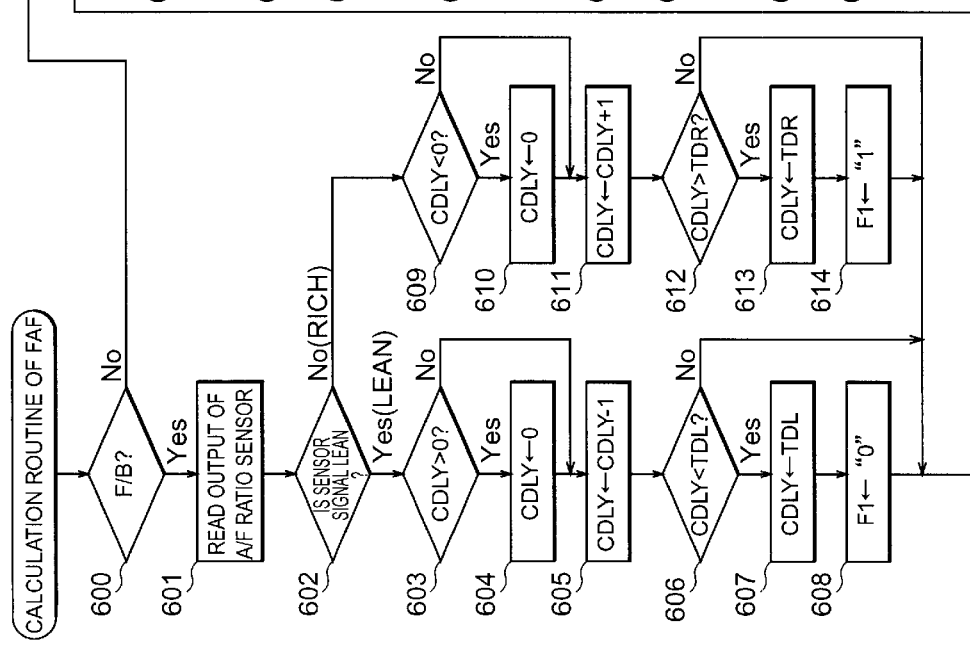

Next, FIG. 12 shows a flowchart for the calculation of the air-fuel ratio feedback correction factor FAF in step 303 described above.

The routine illustrated in FIG. 12 is repeatedly carried out at every predetermined time (e.g., every several milliseconds). The air-fuel ratio sensor 26 for detecting the air-fuel ratio of the engine 1 from the oxygen concentration in the exhaust gas or the like is mounted on the exhaust pipe 31 of the engine 1. The air-fuel ratio feedback correction factor FAF is generated based on the output of this air-fuel ratio sensor 26 and the after-starting fuel injection quantity TAU is corrected based on the air-fuel ratio feedback correction factor FAF generated. An oxygen sensor is commonly used as the air-fuel ratio sensor. The oxygen sensor can determine whether the air-fuel ratio of the engine 1 is richer or leaner than the stoichiometric ratio, from the oxygen concentration in the exhaust gas.

When the air-fuel ratio is leaner than the stoichiometric ratio (a lean air-fuel ratio), the air-fuel ratio feedback correction factor FAF is increased (i.e., is made gradually richer). When the air-fuel ratio is richer than the stoichiometric ratio (a rich air-fuel ratio), the air-fuel ratio feedback correction factor FAF is decreased (i.e., is made gradually leaner). Since in this way the after-starting fuel injection quantity TAU is controlled by the feedback control based on the air-fuel ratio feedback correction factor FAF according to the detection result of the air-fuel ratio sensor 26, the air-fuel ratio can be maintained near the target air-fuel ratio (normally, the stoichiometric ratio) even if there is a small error in the air flow meter for detecting the intake air flow Q, for example.

First, it is determined whether an execution condition is met for the feedback (F/B) control based on the air-fuel ratio feedback correction factor FAF (step 600). The F/B control execution condition is, for example, that the air-fuel ratio sensor 26 is active (the oxygen sensor or the like as the air-fuel ratio sensor has to be brought to a predetermined activation temperature in order to exhibit its function), that the warm-up operation is complete, and so on. When the F/B control execution condition is not met, i.e., when step 600 ends up with no, the air-fuel ratio feedback correction factor FAF is set to 1.0 (step 628), and this routine is terminated.

When the F/B control execution condition is met, i.e., when step 600 ends up with yes, the output of the air-fuel ratio sensor 26 is read in order to carry out the F/B control based on the air-fuel ratio feedback correction factor FAF (step 601), and it is first determined whether the sensor output signal is a lean air-fuel ratio or a rich air-fuel ratio (step 602). Then an air-fuel ratio flag F1 for switching of the air-fuel ratio feedback correction factor FAF is generated in steps 603 to 608 and in steps 609 to 614.

The air-fuel ratio flag F1 is switched from lean (F1=0) to rich (F1=1) when rich signals from the output of the air-fuel ratio sensor 26 continue from a predetermined delay time TDR; or it is switched from rich (F1=1) to lean (F1=0) when lean signals from the output of the air-fuel ratio sensor 26 continue for a predetermined delay time TDL (steps 603 to 614). A delay counter CDLY is used for counting these delay times TDR, TDL.

Then, based on whether this air-fuel ratio flag F1 is lean (F1=0) or rich (F1=1) and based on whether the air-fuel ratio flag F1 was inverted (F1=0→1 or F1=1→0) immediately before, the air-fuel ratio feedback correction factor FAF is generated in steps 615 to 627.

At this time, immediately after the air-fuel ratio flag F1 is judged as having been inverted (step 615), the air-fuel ratio feedback correction factor FAFR or FAFL at that time is once set to FAF (steps 617, 618), and thereafter the air-fuel ratio feedback correction factor FAF is varied in a skipping manner (steps 619, 620). A skipping amount RSL is one used when the air-fuel ratio flag F1 was inverted from lean to rich (F1=0→1). A skipping amount RSR is one used when the air-fuel ratio flag F1 was inverted from rich to lean (F1=1→0). The air-fuel ratio feedback correction factor FAF is varied in the skipping manner immediately after the inversion of the air-fuel ratio flag F1 in this way, in order to enhance the response of air-fuel ratio control.

When the air-fuel ratio flag F1 maintains the value of either lean (F=0) or rich (F=1), the air-fuel ratio feedback correction factor FAF is gradually increased or decreased by a change KIR or KIL, as described above (steps 621 to 623). The change KIR is a unit increase amount used when the air-fuel ratio flag F1 is lean (F1=0). The change KIL is a unit decrease amount used when the air-fuel ratio flag F1 is rich (F1=1). For the air-fuel ratio feedback correction factor FAF, the lower limit thereof is guarded in steps 624, 625, and the upper limit thereof in steps 626, 627.

Figure 13:
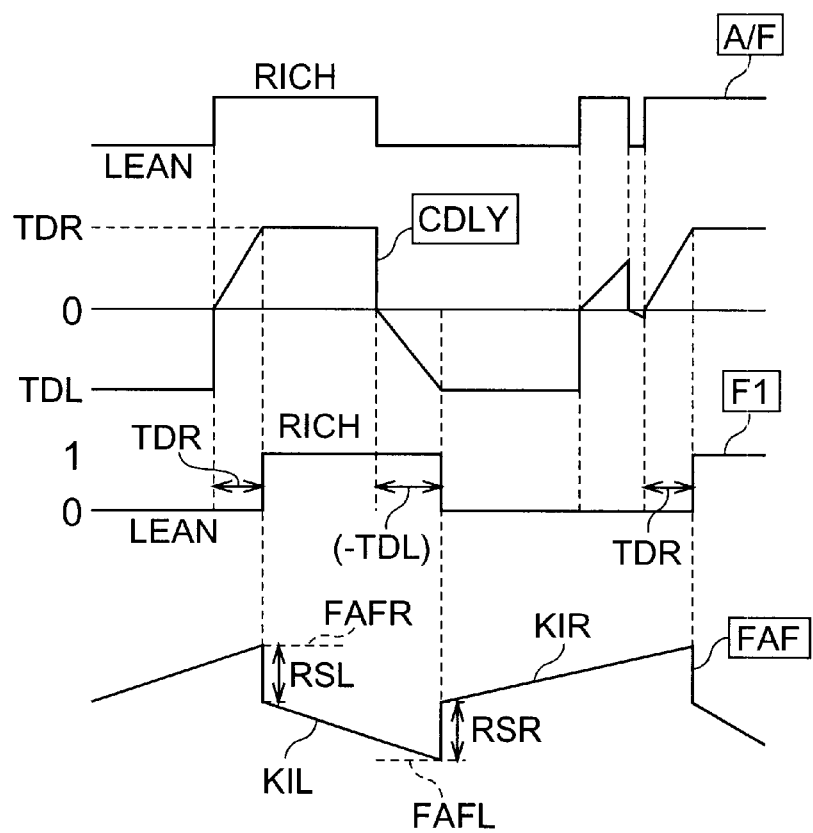
FIG. 13 is a timing chart to show changes of output A/F from an air-fuel ratio sensor, delay counter CDLY, air-fuel ratio flag F1, and air-fuel ratio feedback correction factor FAF.

FIG. 13 shows an example of changes of the output A/F (after A/D conversion) of the air-fuel ratio sensor 26, delay counter CDLY, air-fuel ratio flag F1, and air-fuel ratio feedback correction factor FAF, in the air-fuel ratio feedback control described above.

The reason why the air-fuel ratio feedback correction factor FAF is not generated directly based on the output of the air-fuel ratio sensor 26 but through the air-fuel ratio flag F1, is that the air-fuel ratio is prevented from being disturbed when the predetermined time TDR, -TDL is made in consideration of the response of the air-fuel ratio sensor 26 or when the output of the air-fuel ratio sensor 26 is switched between lean and rich in a short time (see the right part of FIG. 13).

Figure 14:
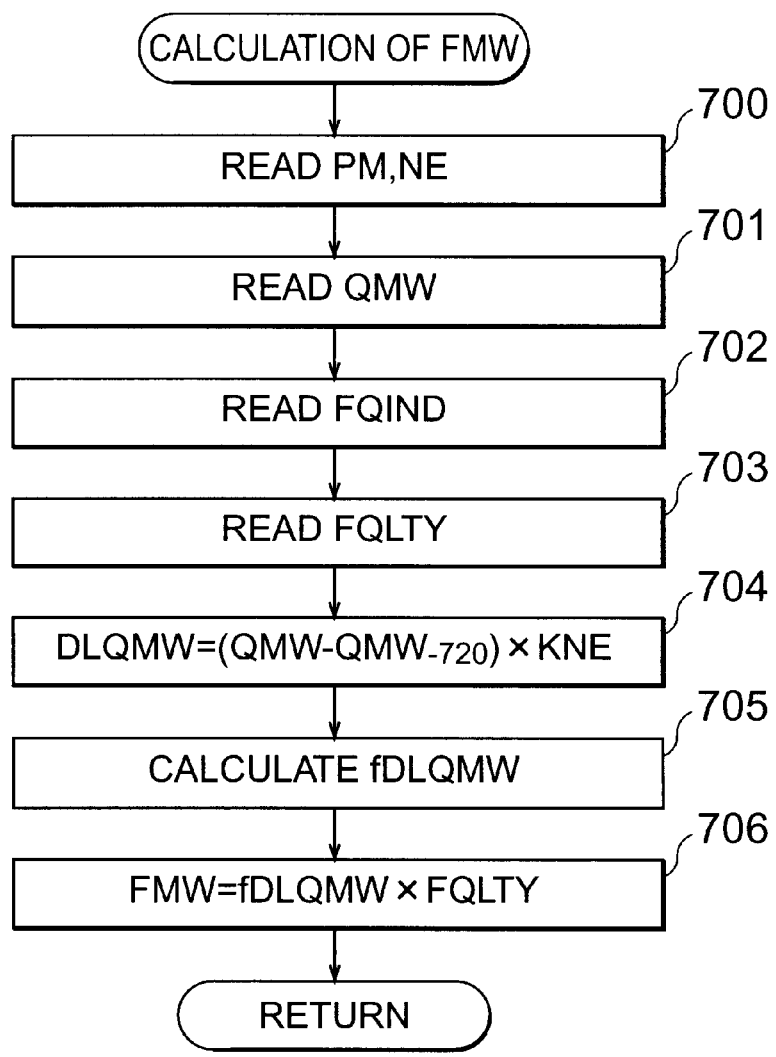
FIG. 14 is a flowchart to show a calculation routine of wall-attaching fuel correction factor FMW.

Further, a flowchart for the calculation of the wall-attaching fuel correction factor FMW in step 304 is presented in FIG. 14.

First, the intake pressure PM and engine speed NE at the closed position of the intake valve are read in from the respective sensors (step 700), and fuel attaching amount QMW with the engine 1 being operated in the steady state at this intake pressure PM, is read from the map in the engine ECU 11 (step 701). The fuel quality index FQIND indicating the fuel quality is read from the backup RAM of the engine ECU 11 (step 702), and from the fuel quality index FQIND thus read, the map in the engine ECU 11 is searched to read the fuel quality correction factor FQLTY (step 703).

Next, based on the fuel attaching amount QMW thus calculated, a fuel attachment change DLQMW is calculated according to Eq (8) below (step 704).

$$DLQMW=(QMW-QMW_{-720}) \times KNE \qquad (8)$$

Here $QMW_{-720}$ is a fuel attaching amount before 720° CA. A rotational speed correction factor KNE is a correction factor determined according to the engine speed NE.

The fuel attachment change DLQMW calculated is a change amount of fuel attaching to the wall surfaces. This change amount is one in several injections and thus this is corrected into one for each of the several injections. The fuel attachment change DLQMW is reduced to a reduced amount fDLQMW per injection (step 705). The detailed description is omitted herein for the method of calculating the reduced amount fDLQMW from the fuel attachment change DLQMW. The wall-attaching fuel correction factor FMW is calculated from the reduced amount fDLQMW and the fuel quality correction factor FQLTY (step 706). As described, the after-starting fuel injection quantity TAU reflects the determined fuel quality (fuel quality index FQIND) through the warm-up or high-load correction factor FWLOTP and the wall-attaching fuel correction factor FMW.

The determination of fuel quality described above was one made in the steady state. The following will describe determination of fuel quality in the transient state.

In the example below, the detection of fuel quality can be implemented in the other states than the steady state as long as the engine 1 is under combustion, excluding such non-combustion periods of the engine 1 as stop periods, cranking periods, fuel cut periods, and so on.

Figure 15:
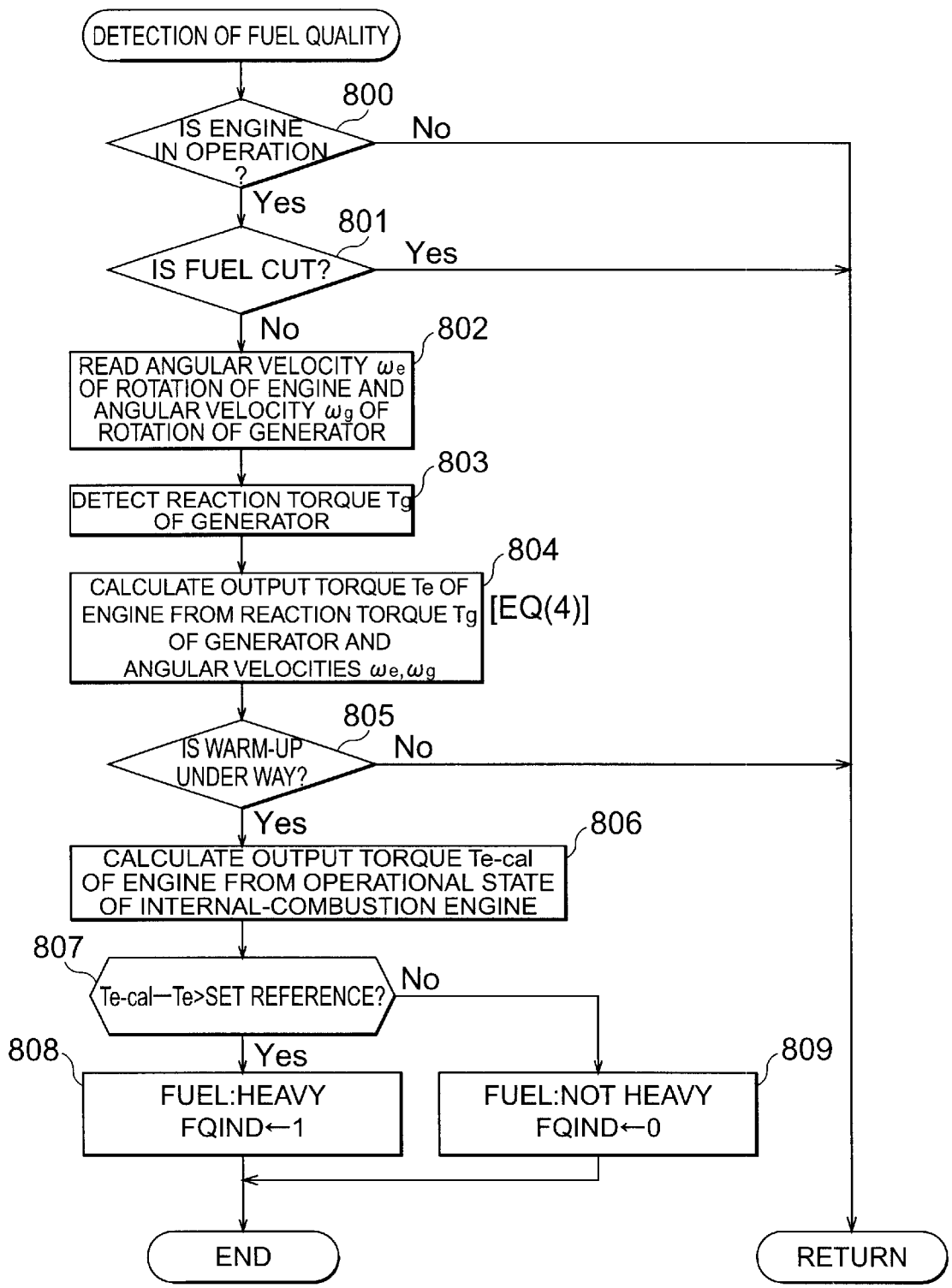
FIG. 15 is a flowchart to show fuel quality detecting operation (in a transient state of the engine) of the output state detecting apparatus of internal-combustion engine according to the present invention.

A flowchart of the fuel quality determining process in the transient state is presented in FIG. 15. The fuel quality determining process in the transient state will be described below along FIG. 15.

First, it is determined whether the engine 1 is in operation (step 800), and with the engine 1 in operation, it is determined whether the fuel is cut (step 801). Unless the fuel is cut, the angular velocity ωe of rotation of the engine 1 and the angular velocity ωg of rotation of MG 3 are read in (step 802).

Then the reaction torque Tg of MG 3 is detected (step 803) and the output torque Te of the engine 1 is calculated using aforementioned Eq (4) from the reaction torque Tg of MG 3, the angular velocity ω of the engine 1, and the angular velocity ωg of Mg 3 (step 804). It is then determined whether the engine is in the warm-up operation (step 805). Since the fuel quality can be determined more accurately during the warm-up operation immediately after cold starting as described above, this routine is configured to determine whether the engine is in the warm-up operation and then detect the fuel quality if the engine is in the warm-up operation.

When the engine is in the warm-up operation, the operational state of the engine 1 is determined based on at least one value of the cooling water temperature, intake air flow, engine speed, air-fuel ratio, and injection timing in order to detect the fuel quality, and the output torque Te-cal of the engine 1 is also calculated from this operational state (step 806). Then the difference is calculated between the output torque Te-cal calculated based on the operational state and the output torque Te of the engine 1 calculated based on the reaction torque Tg of MG 3 and it is then determined whether the difference is greater than a preset reference (step 807).

When the difference between the output torque Te-cal calculated based on the operational state of the engine 1 and the output torque Te of the engine 1 calculated based on the reaction torque Tg of MG 3 is greater than the set reference, the fuel is judged as being heavy and the fuel quality index FQIND is set to 1, which is stored in the backup RAM in the main ECU 10 (step 808). On the other hand, when the difference between the output torque Te-cal calculated based on the operational state of the engine 1 and the output torque Te of the engine 1 calculated based on the reaction torque Tg of MG 3 is smaller than the set reference, the fuel is not considered to be heavy and thus the fuel quality index FQIND is set to 0, which is stored in the backup RAM in the main ECU 10 (step 809).

The fuel quality thus determined is reflected in the operation of the engine 1 thereafter. How the determination of fuel quality described above is reflected in the operation of the engine, was described previously and the description thereof is omitted herein.

The car described above was the so-called hybrid car as a merger of the series system and the parallel system, but the invention is also applicable to hybrid cars of the series system and hybrid cars of the parallel system. The present invention can also be applied to the other cars than the hybrid cars if they are equipped with a generator for generating electric power while receiving the output of the internal-combustion engine. Further, correction with other correction factors not described may be carried out in the aforementioned calculation of fuel injection quantity TAU.

The output torque Te of the engine 1 can be calculated from the reaction torque Tg of MG 3, using the predetermined relations like Eqs (3), (4) between the output torque Te of the engine 1 and the reaction torque Tg of MG 3, and the fuel quality can be determined accurately through the reaction torque Tg of MG 3.

The fuel quality can be determined accurately from the reaction torque Tg of MG 3 even when the engine 1 is operated as maintained in the predetermined region of high energy efficiency by maintaining the speed of the engine 1 in the predetermined region by the rotation control. Even in such a case that the rotation control is carried out with little change in the rotational speed against the difference of the fuel quality, as described above, the fuel quality can be determined accurately.

The fuel determining means has the first torque calculating means and second torque calculating means described above and the fuel quality is determined based on the comparison between the output torques of the engine 1 detected by the respective torque detecting means, whereby more accurate detection can be carried out.

Industrial Applicability

The output state detecting apparatus of internal-combustion engine according to the present invention is able to detect the output state of the internal-combustion engine from the reaction torque of the motor and is thus suitable for detecting the output state of the internal-combustion engine, e.g., in the cars equipped with the internal-combustion engine and the motor.

What is claimed is:

1. An output state detecting apparatus of internal-combustion engine, comprising:
   an internal-combustion engine;
   a generator driven by said internal-combustion engine to generate electric power;
   torque detecting means for detecting a reaction torque of said generator; and
   output state detecting means for detecting an output state of said internal-combustion engine,
   wherein said output state detecting means detects the output state of said internal-combustion engine, based on the reaction torque of said motor detected by said torque detecting means.

2. The output state detecting apparatus of internal-combustion engine according to claim 1,
   wherein said internal-combustion engine and said motor are connected through power dividing means, and
   wherein a predetermined relation is met by a rotational speed of said internal-combustion engine, a rotational speed of said generator, an output torque of said internal-combustion engine, and the reaction torque of said generator.

3. The output state detecting apparatus of internal-combustion engine according to claim 1, wherein said output state detecting means is combustion state determining means for determining a combustion state of said internal-combustion engine.

4. The output state detecting apparatus of internal-combustion engine according to claim 3, further comprising rotation detecting means for detecting a rotational speed of said internal-combustion engine, wherein said combustion state determining means references said rotational speed of said internal-combustion engine on the occasion of determining the combustion state of said internal-combustion engine.

5. The output state detecting apparatus of internal-combustion engine according to claim 3, further comprising:
   rotation control means for controlling said generator to maintain a rotational speed of said internal-combustion engine in a predetermined range; and
   required torque calculating means for calculating a target of an output torque of said internal-combustion engine,
   wherein said combustion state determining means compares the target of the output torque of said internal-combustion engine calculated by said required torque calculating means with an output torque of said internal-combustion engine calculated from the reaction torque detected by said torque detecting means, thereby determining the combustion state of said internal-combustion engine.

6. The output state detecting apparatus of internal-combustion engine according to claim 3, further comprising:
   rotation control means for controlling said generator to maintain a rotational speed of said internal-combustion engine in a predetermined range; and
   rotation detecting means for detecting the rotational speed of said internal-combustion engine,
   wherein when said internal-combustion engine is in a self-sustaining operation in which said rotation control means is not controlling the rotational speed of said internal-combustion engine, said combustion state detecting means determines the combustion state of said internal-combustion engine, based on the rotational speed of said internal-combustion engine detected by said rotation detecting means.

7. The output state detecting apparatus of internal-combustion engine according to claim 3, further comprising operational state detecting means for detecting various information that can affect the operational state of said internal-combustion engine,
   wherein said combustion state determining means changes a threshold used in the determination of the combustion state, according to the various information detected by said operation condition detecting means.

8. The output state detecting apparatus of internal-combustion engine according to claim 7, wherein said various information detected by said operational state detecting means is either of the atmospheric pressure, a cooling water temperature of said internal-combustion engine, an intake air flow, an engine speed, an air-fuel ratio, ignition timing, fuel quality, and electric power generated by said generator, or a combination thereof.

9. The output state detecting apparatus of internal-combustion engine according to claim 3, further comprising rotation control means for controlling a rotational speed of said generator to maintain a rotational speed of said internal-combustion engine in a predetermined range,
   wherein said combustion state determining means halts the determination of the combustion state when a control variable of said rotation control means is not less than a predetermined threshold.

10. The output state detecting apparatus of internal-combustion engine according to claim 9, wherein said rotation control means controls the rotational speed of said generator by PID control, and wherein said combustion state determining means determines that the control variable of said rotation control means is not less than the predetermined threshold, when a change amount of the component P in said PID control is not less than a predetermined value.

11. The output state detecting apparatus of internal-combustion engine according to claim 3, further comprising:

rotation control means for controlling said generator to maintain a rotational speed of said internal-combustion engine in a predetermined range; and rotational speed detecting means for detecting the rotational speed of said internal-combustion engine, wherein said combustion state detecting means halts the control carried out by said rotation control means and determines the combustion state of said internal-combustion engine, based on the rotational speed of said internal-combustion engine detected in the halt state by said rotation detecting means.

12. The output state detecting apparatus of internal-combustion engine according to claim 3, wherein said internal-combustion engine is a multiple-cylinder internal-combustion engine, said output state detecting apparatus further comprising cylinder discriminating means for discriminating a cylinder under execution of a combustion stroke in said internal-combustion engine, wherein said combustion state determining means determines a combustion state of each cylinder from the reaction torque detected by said torque detecting means and the cylinder under the execution of the combustion stroke discriminated by said cylinder discriminating means.

13. The output state detecting apparatus of internal-combustion engine according to claim 12, further comprising combustion state changing means for changing a combustion condition in a cylinder a combustion state of which was determined as being instable by said combustion state determining means, to control the combustion state toward a stable combustion state.

14. The output state detecting apparatus of internal-combustion engine according to claim 1, wherein said output state detecting means is fuel quality determining means for determining fuel quality of said internal-combustion engine.

15. The output state detecting apparatus of internal-combustion engine according to claim 14, further comprising rotation control means for controlling said generator to maintain an rotational speed of said internal-combustion engine in a predetermined range, wherein said fuel quality determining means determines the fuel quality, based on a result of detection of said torque detecting means during a period in which said rotation control means maintains the rotational speed of said internal-combustion engine in the predetermined range.

16. The output state detecting apparatus of internal-combustion engine according to claim 14, wherein said fuel quality determining means comprises first torque calculating means for calculating an output torque of said internal-combustion engine, based on the reaction torque detected by said torque detecting means, and second torque calculating means for calculating an output torque of said internal-combustion engine from an operational state of said internal-combustion engine, wherein the fuel quality is determined based on comparison between the output torques calculated by said first torque calculating means and said second torque calculating means.

17. The output state detecting apparatus of internal-combustion engine according to claim 16, wherein said second torque calculating means judges the operational state of said internal-combustion engine and calculates the output torque of said internal-combustion engine, based on at least one value of a cooling water temperature, an intake air flow rate, an engine rotational speed, an air-fuel ratio, and ignition timing.

18. The output state detecting apparatus of internal-combustion engine according to claim 14, wherein said fuel quality determining means determines the fuel quality, based on a result of detection of said torque detecting means immediately after cold starting.

19. The output state detecting apparatus of internal-combustion engine according to claim 16, wherein said fuel quality determining means determines the fuel quality, based on a result of detection of said torque detecting means immediately after cold starting.

20. The output state detecting apparatus of internal-combustion engine according to claim 17, wherein said fuel quality determining means determines the fuel quality, based on a result of detection of said torque detecting means immediately after cold starting.

* * * * *